H. W. B. GRAHAM.
APPARATUS FOR MAKING BRICKS.
APPLICATION FILED MAR. 9, 1916.
1,301,685.
Patented Apr. 22, 1919.
12 SHEETS—SHEET 12.
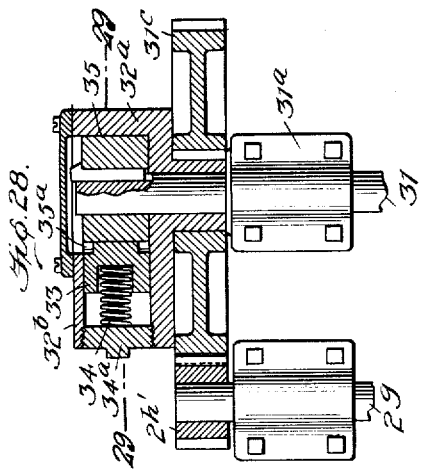
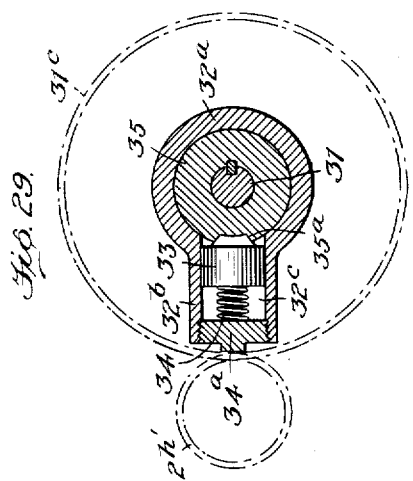
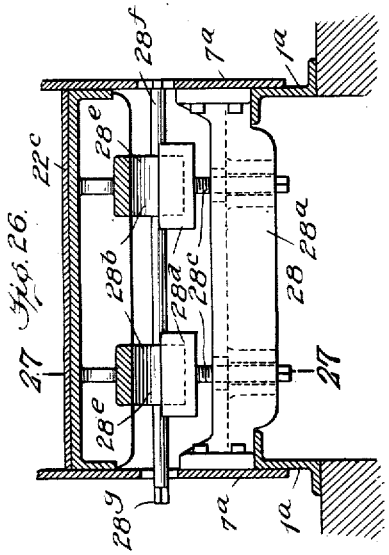
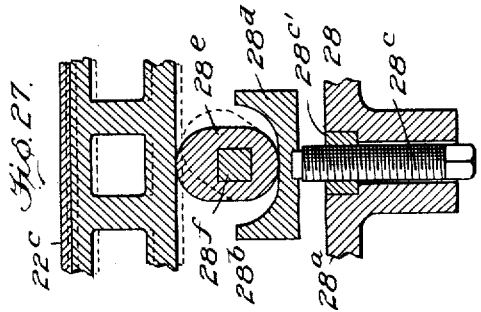
Inventor
Henry W. B. Graham
By Edward R. Alexander
Attorney ered in the drawings.

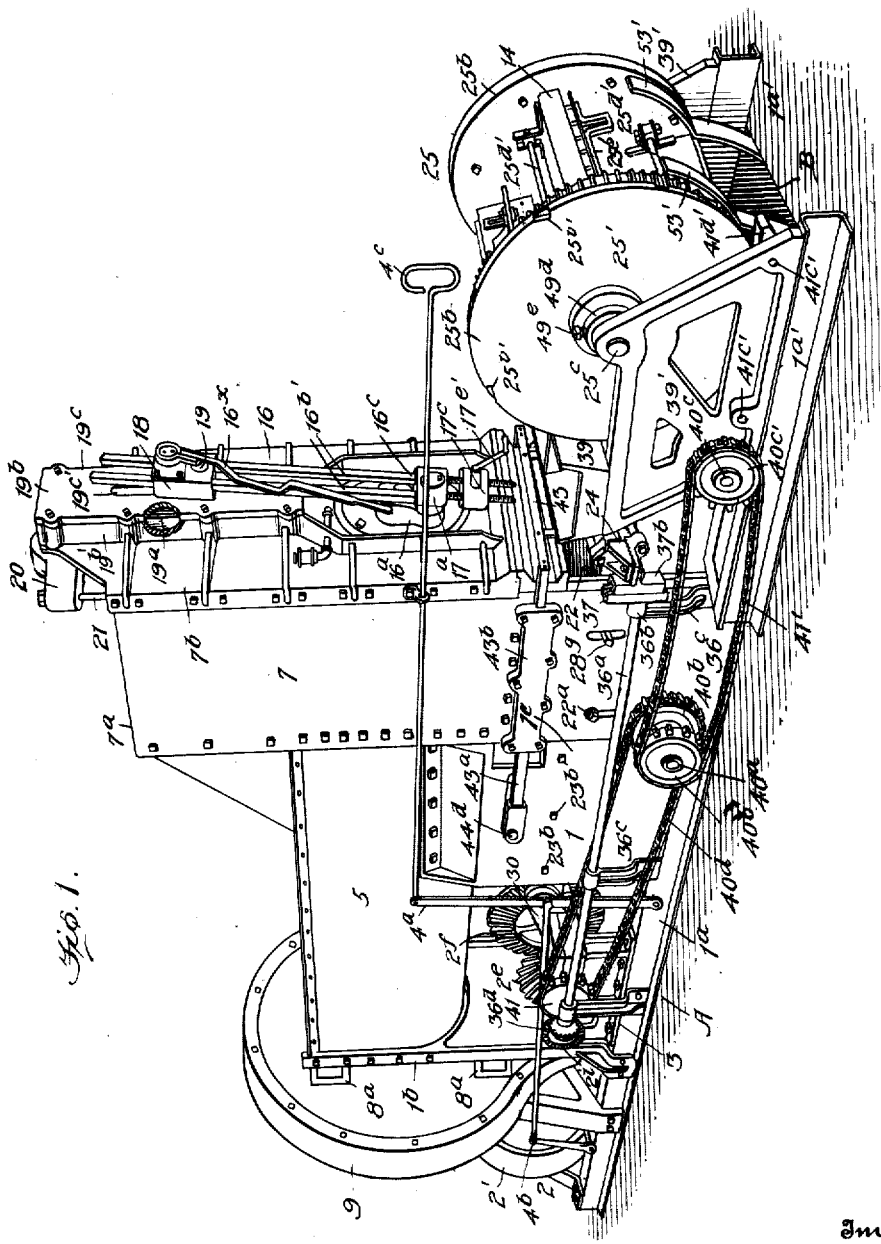

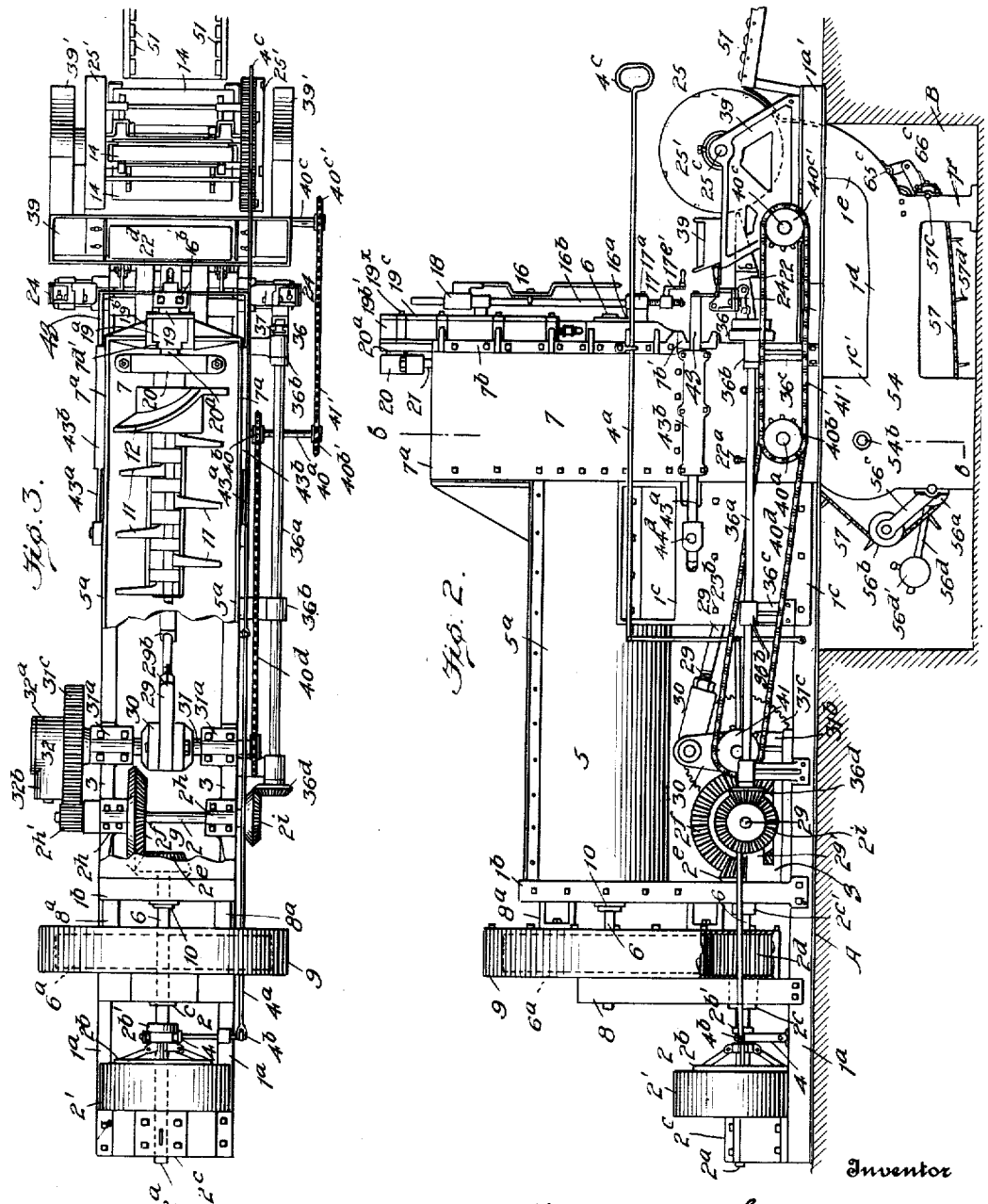

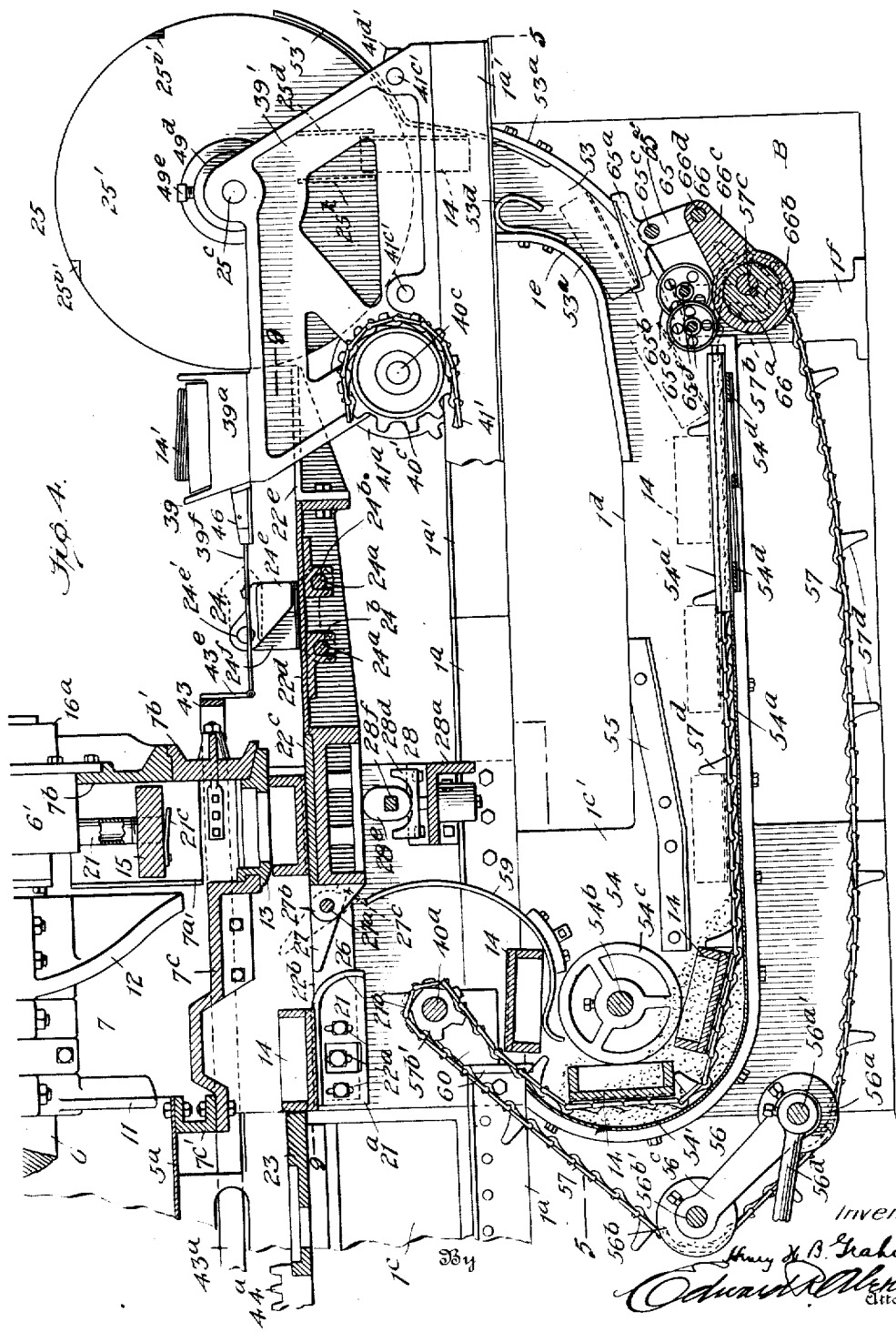

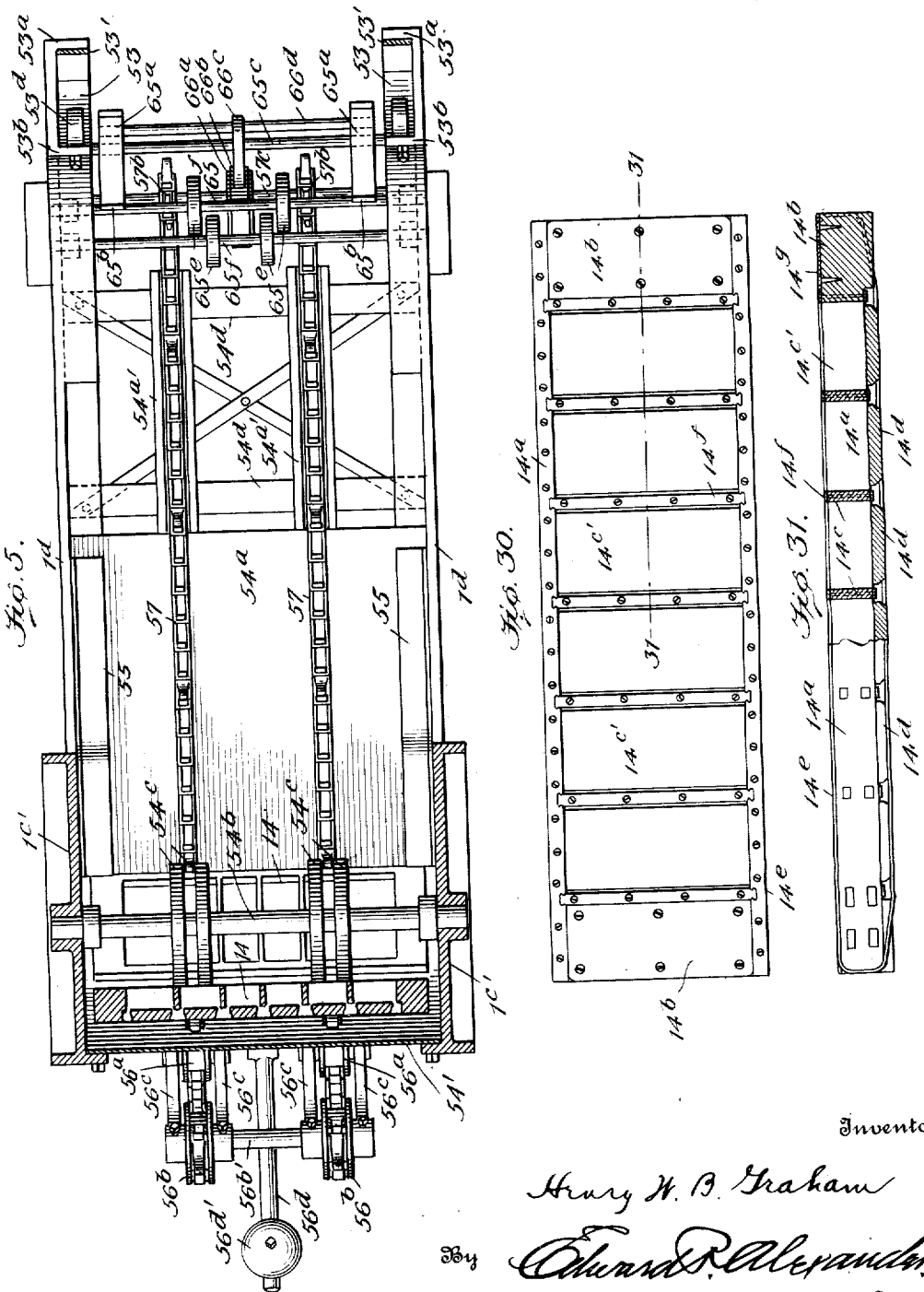

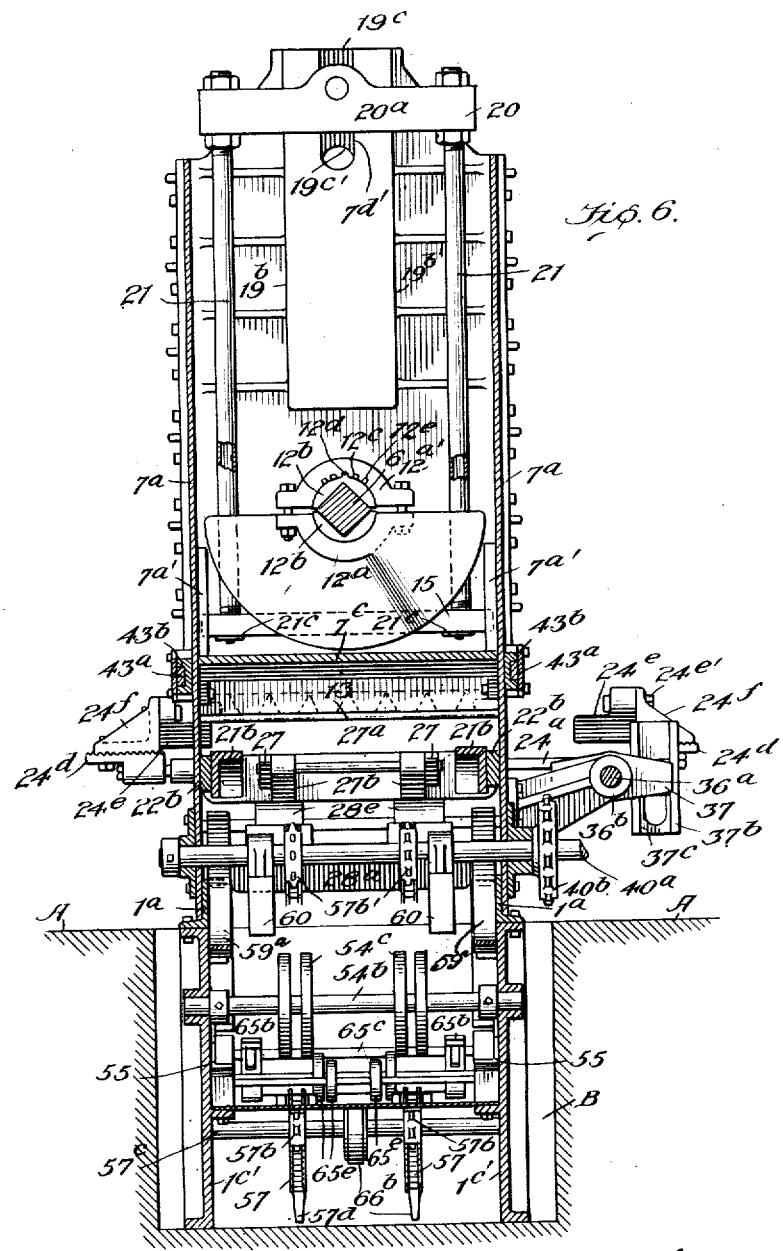

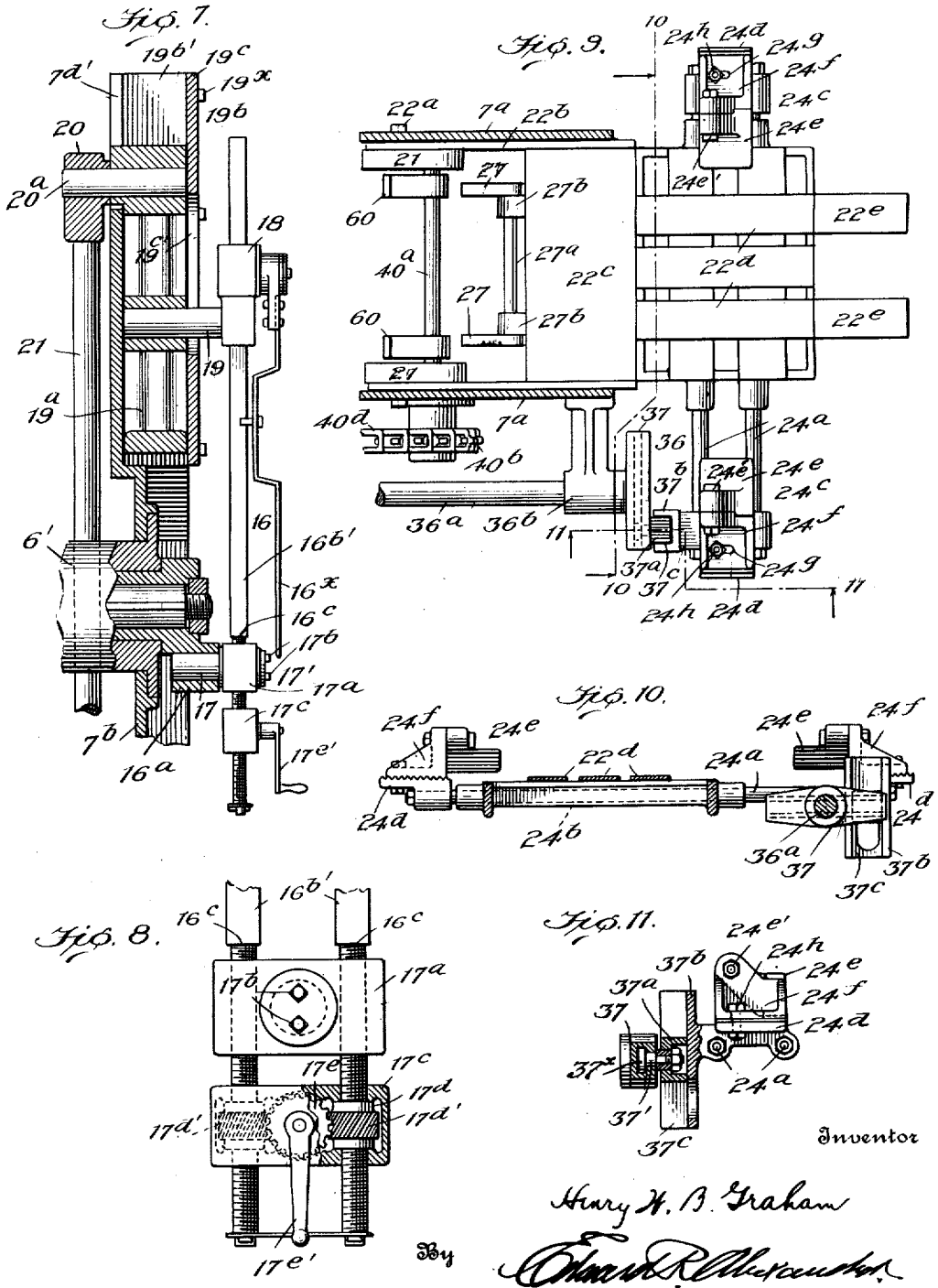

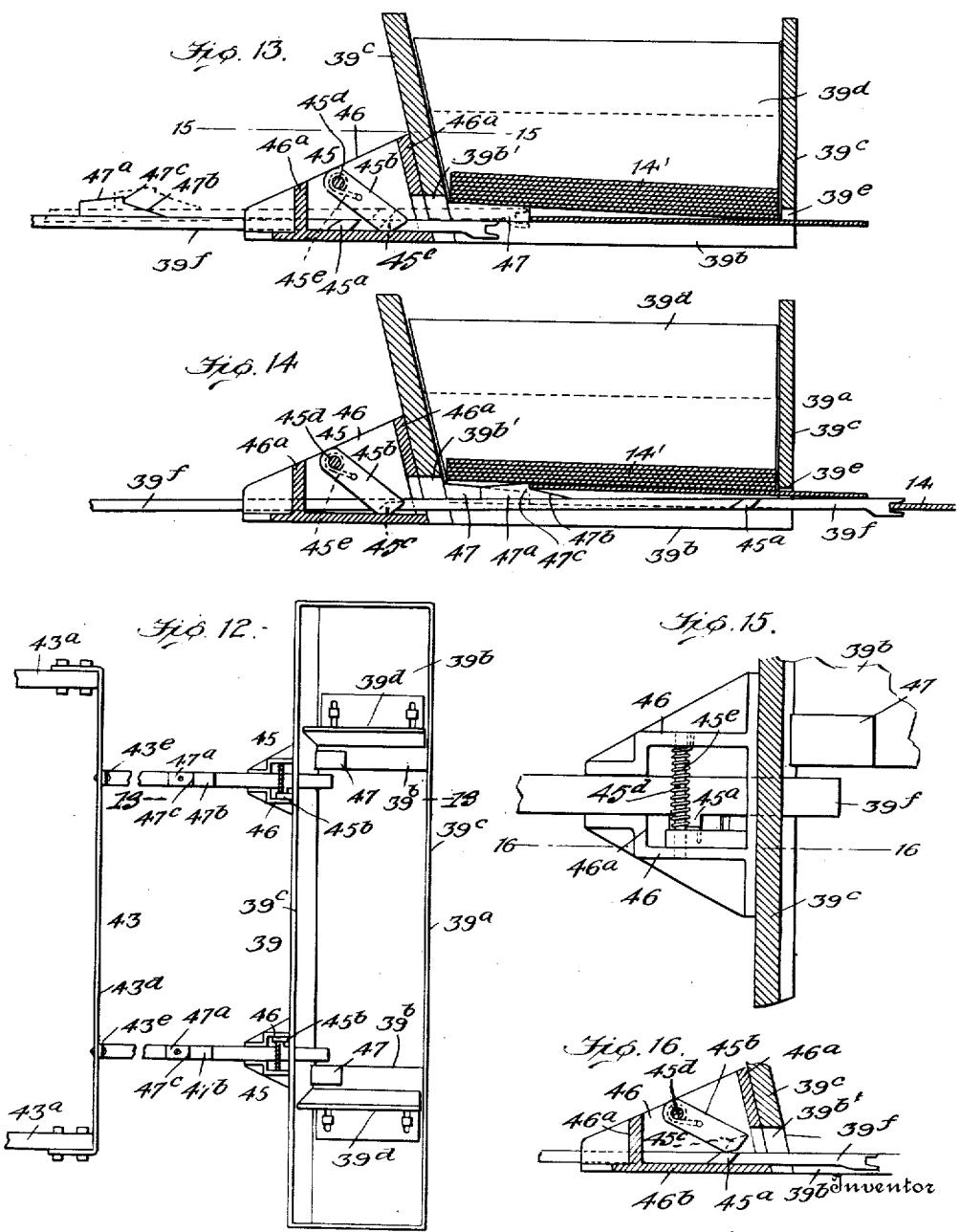

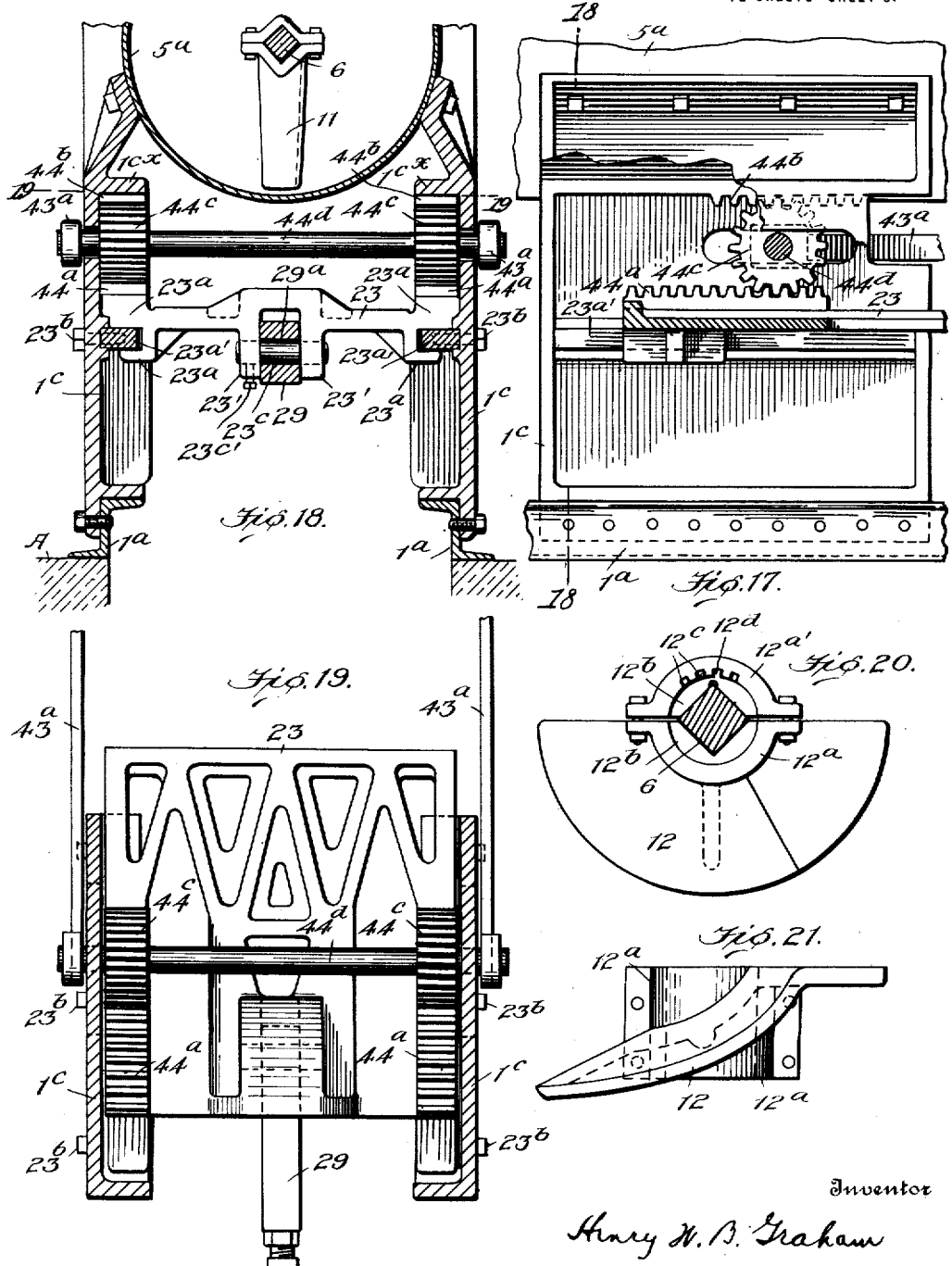

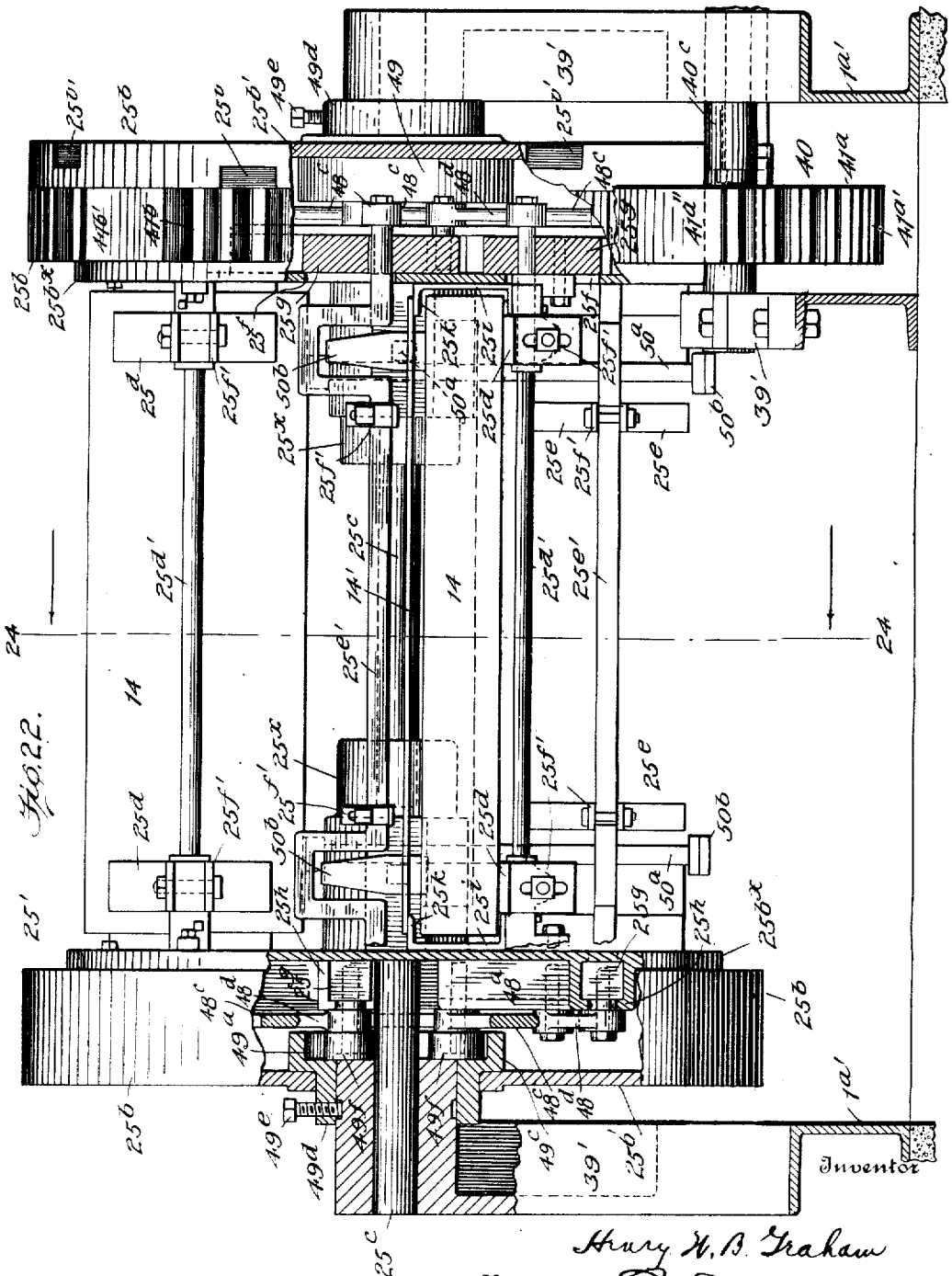

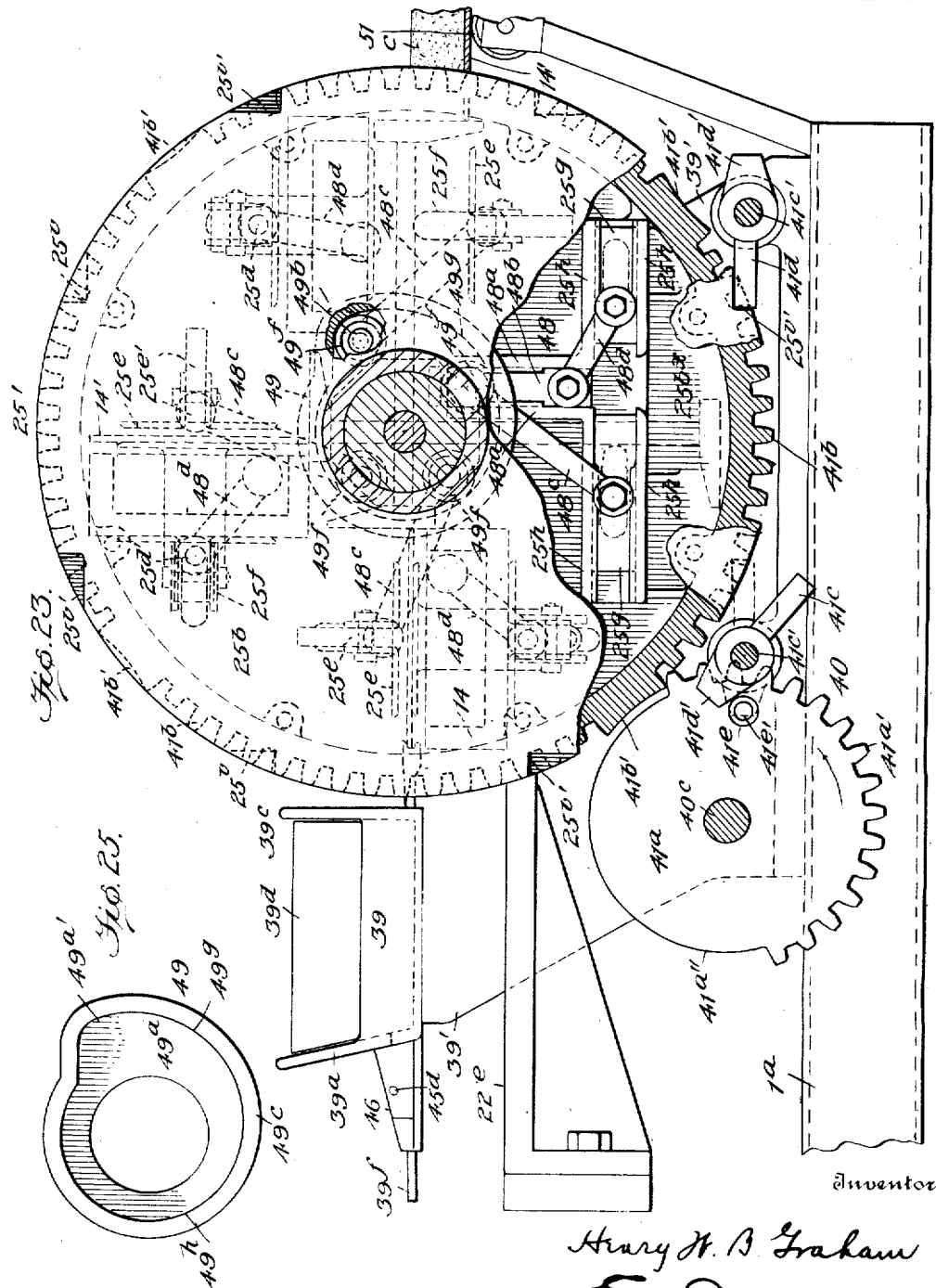

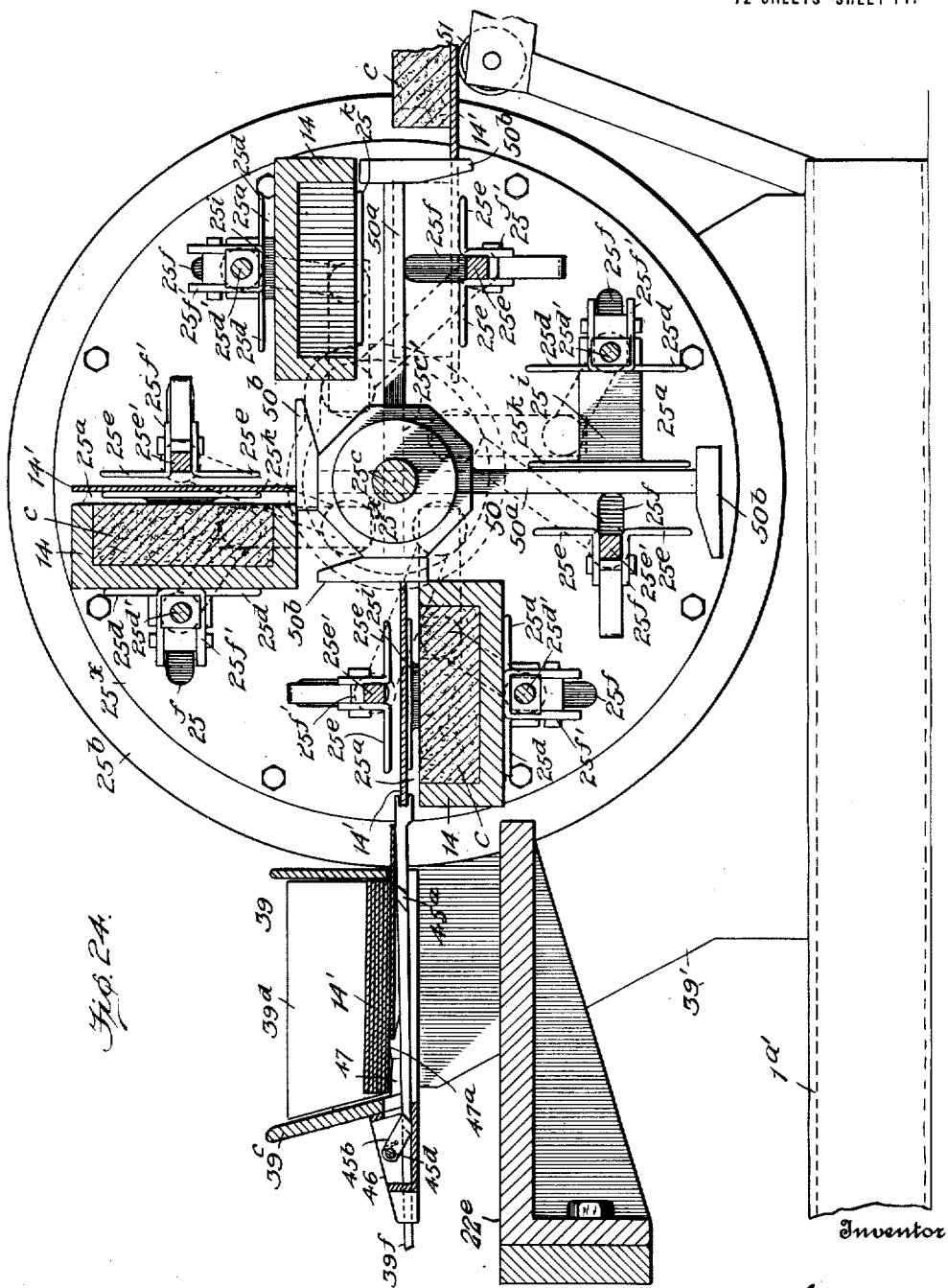

UNITED STATES PATENT OFFICE.

HENRY W. B. GRAHAM, OF NEW LONDON, OHIO, ASSIGNOR TO THE ARNOLD-CREAGER COMPANY, OF NEW LONDON, OHIO, A CORPORATION OF OHIO.

APPARATUS FOR MAKING BRICKS.

1,301,685.     Specification of Letters Patent.     Patented Apr. 22, 1919.

Application filed March 9, 1916. Serial No. 83,052.

*To all whom it may concern:*

Be it known that I, HENRY W. B. GRAHAM, a citizen of the United States, residing at New London, in the county of Huron and State of Ohio, have invented certain new and useful Improvements in and Relating to Apparatus for Making Bricks, of which the following is a specification.

This invention relates to apparatus for molding bricks.

One object of the invention is to provide mechanism for molding bricks and handling the molds therefor, whereby the output of the machine is greatly increased and the required manual labor and cost of production is reduced to a minimum.

Another object of the invention is to combine with apparatus of this character an improved mechanism for dumping the bricks from the molds.

Another object of the invention is to combine with apparatus of this character an improved mechanism for dumping the bricks from the molds and separating the bricks and molds from each other.

Another object of the invention is to provide in apparatus of this character improved mechanisms for dumping the bricks from the molds and for sanding the molds ready for refilling.

Another object of the invention is to provide apparatus of this character in which mechanisms are combined and correlated therewith to successively deliver molds to and from the filling position, to dump the bricks from the molds and return the empty molds to the mold delivery mechanism.

Another object of the invention is to provide an improved mechanism for dumping the bricks from the molds and separating the bricks and molds from each other.

Another object of the invention is to provide a rotatable carrier adapted to dump the bricks from the molds and separate the bricks and the molds from each other.

Another object of the invention is to provide a rotatable mechanism for dumping and separating the molds and to correlate therewith means for discharging the bricks from the rotatable mechanism.

Another object of the invention is to provide rotatable mechanism for dumping the bricks and separating the bricks and molds from each other and to mount on said mechanism means for discharging the bricks therefrom.

Another object of the invention is to provide an intermittently operated rotatable carrier adapted to receive filled molds of bricks at a predetermined position, to invert the molds to dump the bricks and means on the carrier for separating the bricks and molds from each other and discharging the dumped bricks from the carrier.

Another object of the invention is to provide in apparatus of this character having mechanism for dumping the bricks from the molds, improved means for feeding pallets to the dumping mechanism.

Another object of the invention is to provide in apparatus of this character having a filling mechanism, a dumping mechanism and mold moving mechanism, improved means for delivering a pallet with each mold to the dumping mechanism.

Another object of the invention is to combine with a mold filling mechanism, means for conveying a series of molds to and from a position for filling and improved means for regulating the movement of the molds at a point in their path of movement, whereby they are controlled and moved singly so as to be delivered to the filling position successively and in coöperative relation therewith and with other operative parts of the apparatus.

Other objects of the invention will be apparent to those skilled in the art to which my invention relates from the following description taken in connection with the accompanying drawings.

Referring to the drawings, Figure 1 is a perspective view of an apparatus for making bricks embodying my invention.

Fig. 2 is a side elevation of the same.

Fig. 3 is a top plan view of the apparatus with parts broken away.

Fig. 4 is a fragmentary central longitudinal sectional view, somewhat enlarged.

Fig. 5 is a horizontal sectional view on the line 5—5 of Fig. 4.

Fig. 6 is a transverse sectional view on the line 6—6 of Fig. 2, enlarged.

Fig. 7 is a fragmentary elevational view of the press-platen operating mechanism, with adjacent parts of the charging chamber and pug mill shaft and the bearings for the latter shown in section.

Fig. 8 is a fragmentary view of the lower end of the pitman, showing in detail the adjusting means between the pitman and the crank.

Fig. 9 is a fragmentary horizontal sectional view on the line 9—9 of Fig. 4.

Fig. 10 is a transverse sectional view on the line 10—10 of Fig. 9.

Fig. 11 is a fragmentary sectional view on the line 11—11 of Fig. 9.

Fig. 12 is a top plan view of the pallet supply and feeding devices.

Fig. 13 is a transverse sectional view on the line 13—13 of Fig. 12, enlarged.

Fig. 14 is a view similar to Fig. 13, but showing the operation of a thrust member.

Fig. 15 is a fragmentary view of parts of the pallet feeding mechanism, somewhat enlarged.

Fig. 16 is a sectional view on the line 16—16 of Fig. 15.

Fig. 17 is a fragmentary side elevation with parts broken away to show the operating mechanism for the pallet feeding thrust members.

Fig. 18 is a vertical sectional view on the line 18—18 of Fig. 17.

Fig. 19 is a horizontal sectional view on the line 19—19 of Fig. 18.

Fig. 20 is a rear elevation of the wiper, the pug mill shaft being shown in section.

Fig. 21 is a plan view of the wiper.

Fig. 22 is a view of the dumping mechanism, looking from the rear, with parts broken away to facilitate the illustration.

Fig. 23 is a side elevation, partly in section, of the dumping mechanism.

Fig. 24 is a sectional view on the line 24—24 of Fig. 22.

Fig. 25 is a detail view of the device for controlling the connections between the mold pocket members.

Fig. 26 is a transverse sectional view of the auxiliary supporting devices for the base or platform.

Fig. 27 is a sectional view on the line 27—27 of Fig. 26.

Fig. 28 is a detail view, partly in section, of the safety connections between certain of the power transmitting devices.

Fig. 29 is a sectional view on the line 29—29 of Fig. 28.

Fig. 30 is a top plan view of a mold.

Fig. 31 is a side elevation of the mold, partly in section.

In the drawings, 1 indicates as an entirety the frame work for the apparatus. This frame work 1 preferably comprises pairs of longitudinal sills $1^a$, $1^{a'}$, an upright transverse member $1^b$, longitudinally extending upright plates or equivalent members $1^c$, each of which may rest upon and be bolted to an adjacent sill $1^a$, and supplemental frame $1^{c'}$. By preference, the sills $1^a$, $1^{a'}$, rest upon the flooring A, in which event the latter may be cut away to form a pit B for a purpose to be later described.

2 indicates as an entirety the driving mechanism for the apparatus. The driving mechanism 2 preferably comprises a shaft $2^a$, to which is splined the movable member of a clutch $2^b$. The shaft $2^a$ is mounted in bearings $2^c$, $2^c$, $2^{c'}$, which may be of any suitable construction, the latter bearing being preferably provided in the frame member $1^b$. $2'$ indicates a pulley loosely mounted on the shaft $2^a$. The pulley $2'$ carries the other member (not shown) of the clutch $2^b$. The pulley is driven by a belt from some suitable source of power; it serves to drive the shaft $2^a$ when the members of the clutch $2^b$ are connected together. Intermediate its ends, the shaft $2^a$ carries a pinion $2^d$ for a purpose to be later described, and at its forward end the shaft $2^a$ carries a bevel pinion $2^e$, which meshes with and drives a bevel gear $2^f$ fixed to a transverse shaft $2^g$. The shaft $2^g$ is supported at or near its opposite ends in bearings $2^h$, which are provided in arms $2^{g'}$ of base blocks 3. The blocks 3 are rigidly supported on the sills $1^a$, $1^a$, in any suitable manner. At one end, the shaft $2^g$ carries a spur gear $2^{h'}$ and at its opposite end it carries a bevel gear $2^i$. The purpose of these gears will be later described.

The movable member of the clutch $2^b$ has secured to it a collar $2^{b'}$. 4 indicates a lever one end of which is bifurcated and connected to the collar $2^{b'}$. Movement of the lever 4 serves to throw the movable clutch member into and out of operative relation, in a well known manner. $4^a$ indicates a set of connected links and rods connected at one end to the opposite end of the lever 4, as shown at $4^b$; at the opposite or front end of the connected links and rods $4^a$ there is provided a handle $4^c$, by means of which an operative is enabled to start and stop the apparatus from its front end. The set of operating connections $4^a$ preferably extend along one side of the apparatus within convenient reach of the operative so that he can throw the clutch in or out from any point where he happens to be.

5 indicates as an entirety a pug mill. The pug mill 5 comprises a casing $5^a$, preferably of U-shape in cross section, and a shaft 6 which extends therethrough. The casing $5^a$ is supported at its front end by the frame members $1^c$. The rear end of the casing $5^a$ may be secured in any suitable manner to and supported by the frame member $1^b$, which may form the rear end wall for the casing. The front end of the casing $5^a$ leads into a charging chamber 7. The charging chamber 7 is preferably formed by side plates $7^a$ and a front plate $7^b$ arranged at right angles thereto. The side plates $7^a$ preferably rest upon the supplemental frame 1ᶜ' and may assist in supporting the front end of the casing 5ª, while the front plate 7ᵇ is, by preference, bolted in any suitable manner to the front edges of the side plates 7ª.

The supplemental frame 1ᶜ' preferably consists of a pair of upright members which rest on the bottom of the pit B. Each supplemental frame member is preferably provided with an extension 1ᵈ which at its front end curves upwardly, as shown at 1ᵉ. The extension may be supported by a leg 1ᶠ.

The charging chamber 7 is provided with a bottom 7ᶜ, which by preference is disposed in a substantially horizontal plane slightly below the bottom of the casing 5ª, and connected thereto by a cross beam 7ᶜ'.

The pug-mill shaft 6 preferably extends entirely through the casing 5ª and charging chamber 7 and has bearing at its front end in a bearing box or journal 6' mounted in a recess formed in the front plate 7ᵇ. The opposite end of the shaft extends through and has bearing in the transverse frame member 1ᵇ. That portion of the shaft 6, which is within the pug mill 5 and chamber 7, may be square in cross-section. 6ª indicates a gear carried by the rear end of the shaft 6, outside of or beyond the casing 5ª, and in position to mesh with the pinion 2ᵈ, whereby said gear and shaft are rotated.

8 indicates an upright hanger supported by the sills 1ª. The hanger 8 is provided with suitable bearings to receive and support the rear end of the pug mill shaft 6. The hanger 8 also forms in part a support for a casing 9 which incloses the gear 6ª and pinion 2ᵈ to protect these parts from dust and dirt. 8ª indicates one or more brackets, which are connected to the frame member 1ᵇ and casing 9 and assist in supporting and bracing the latter.

10 indicates a gland to prevent the escape of material through or around the shaft bearing in the frame 1ᵇ.

11 indicates a series of stirring and propelling members fixed to the pug mill shaft 6. These members are spaced relative to each other along said shaft and arranged at different positions angularly thereon, for the purpose of effectively stirring material dumped into the pug mill casing 5ª and propelling it toward and into the charging chamber 7.

The stirring, agitating and propelling members 11 may be of any suitable form of construction; and a larger or lesser number may be provided on the shaft 6 as may be found necessary to properly agitate, temper and feed forwardly the material in the pug mill casing 5ª according to the amount, kind and condition of the material placed therein.

12 indicates a wiper which is secured to the pug mill shaft 6 at a point rearward of but in close proximity to the front end of the charging chamber 7. The wiper is preferably adjustably connected to the shaft 6, so that it can be positioned angularly thereon for effective coöperation with the movement of the press platen to force the clay into the space therebelow at the proper time. Such adjustment may also be found desirable due to the consistency of the clay. The preferred form of connections consist of complementary curved members 12ª, 12ª', the former being preferably formed integrally with the wiper 12 and the latter being adapted to be bolted thereto; complementary bushing members 12ᵇ, 12ᵇ, having angle faces for engagement with the shaft 6; and interlocking devices 12ᶜ between one of the bushing members and the adjacent complementary curved member. The interlocking devices may comprise a lug 12ᵈ, carried by one of the bushing members and arranged to fit within a recess 12ᵉ formed in the curved member 12ª'. I have shown four recesses 12ᵉ which permit of adjustment of the wiper to one of four positions. The members 12ª, 12ª', and 12ᵇ, 12ᵇ, permit of the adjustment of the wiper 12 a quarter turn on the shaft 6, while the interlocking devices 12ᶜ permit of intermediate adjustments.

13 indicates a die which is mounted between the front edge of the bottom 7ᶜ and the front plate 7ᵇ, or a removable section plate 7ᵇ', of the charging chamber 7. The die 13 is preferably of rectangular shape and heavily constructed to withstand the strains to which it is subjected. The lower surface or edge of the die 13 is preferably flat in order to engage with the upper surface of each mold, indicated at 14, and scrape the surplus material therefrom in a manner well known to those skilled in the art to which my invention relates.

The front plate section 7ᵇ' is preferably removably held in place by bolts, the inner ends of which may be flattened and riveted or bolted to the inner walls of the side plates 7ª (see Fig. 4).

In the use herein of the term "mold" I wish to be understood to mean a mold in which one or a plurality of mold sections are provided. In practice, it will be found desirable, for obvious reasons, to provide a plural section mold, such as I have chosen to illustrate in the accompanying drawings—see Figs. 30 and 31. Each mold 14 may be of rectangular shape and comprise a pair of side members 14ª, and a pair of end members 14ᵇ each connected to adjacent ends of the side members 14ª. 14ᶜ indicates a plurality of partitions uniformly spaced from each other and the inner walls of the end members 14ᵇ to divide the frame into a plurality of sections 14ᶜ', each of which forms a brick mold. 14ᵈ indicates a plurality of bottoms one for each mold section 14ᶜ'. The bottoms 14ᵈ are preferably spaced from each other a distance slightly greater than the thickness of each partition so as to provide vents. When the mold sections are being filled, the air therein is forced out through these vents; on the other hand, when the mold 14 is dumped, air has access to the under side of the bricks to prevent a vacuum. The end members 14ᵇ for the molds preferably comprise blocks of rectangular shape in cross section. The blocks 14ᵇ are of a size to provide relatively wide upper and lower surfaces which serve as shoes on which the mold 14 runs or slides through the apparatus, as will be later described. This form of construction is of special advantage in properly supporting and guiding the mold when inverted. The upper surfaces of the blocks 14ᵇ are preferably disposed in the plane of the upper edges of the sides 14ᶜ; but for reasons about to be set forth, the blocks 14ᵇ are not as thick as the side members 14ᵃ are high, so that their lower surfaces are disposed in a plane slightly above the lower surfaces of the bottoms 14ᵈ. It is my custom to soak the molds in water in order to cause the same to stick to the walls of the molds as they move through the sander. This water-soaking operation causes the end members 14ᵇ to swell slightly in size, thus increasing their thickness or height. Accordingly, when the end members of the mold were made equal in thickness to the height of the side members or body portion of the mold and the latter was moved over the table to a position below the die 13, the table and die would engage with the end members, but as these members had, due to their water soaked condition, become thicker than the body of the mold, they would prevent the die from engaging the body portion of the mold between the end members. As a result a space was formed between the body portion of the mold and the lower surface of the die. When the mold was again moved forward, the scraping edge of the die did not scrape off the material disposed above the plane of the upper surface of the mold; but due to the space between the upper edge of the mold and the scraping edge of the die, a thin layer of material was left on top of the mold, which material had to be scraped off by a separate operation.

In my improved construction of mold, the end blocks 14ᵇ are not as high as the body portion of the mold, so that they cannot, even when water soaked, prevent the engagement of the die 13 with the entire upper surface of the mold between the end blocks 14ᵇ (as shown in Fig. 5); accordingly, when the mold is positioned for filling and filled and is again moved forward, the die will scrape off all material above the upper surface of the mold. 14ᵉ indicates a metallic binding strip extending along the upper edge of each side member 14ᵃ, then around the ends of the side members and over the bottoms 14ᵈ. 14ᶠ indicates similar strips extending along the upper surfaces of the partitions 14ᶜ. Each end of the strips 14ᶠ is preferably secured to the adjacent strip 14ᵉ by a dove tail joint. 14ᵍ indicates a bearing plate mounted on the upper surface of each block 14ᵇ. The strips 14ᵉ and 14ᶠ and the plates 14ᵍ may be secured to their respective mold parts in any desired manner.

No claim is made herein to the disclosed subject-matter relating to the mold, the invention therein being claimed by me in my co-pending application filed October 27th, 1916, Serial No. 127,981.

15 indicates a press-platen adapted to force the material through the die 13 into the molds 14. The platen 15 extends across the charging chamber 7, its opposite ends being guided by the flanges of angle plates 7ᵃ', each fixed in any desired manner to the adjacent side wall 7ᵃ. 16 indicates as an entirety the mechanism for reciprocating the press-platen. Of this mechanism, 16ᵃ indicates a crank fixed to the front end of the pug mill shaft 6. 16ᵇ indicates a pitman connected at its lower end through a wrist pin 17 with the crank 16ᵃ and at its upper end pivotally connected through a block 18 to a projection or shaft 19 of a reciprocating member or plunger 19ᵃ. The pitman 16ᵇ preferably comprises two parallel rods 16ᵇ', disposed upon opposite sides of the wrist pin 17 and shaft 19. The pivot connections between the pitman 16ᵇ and shaft 19 may include devices constructed to permit disconnection of these parts from each other automatically when some obstruction prevents operation of the press platen, or manually when it is desired to operate the crank without reciprocating the platen 15. When so constructed, I provide an operating lever 16ˣ by which the manual or positive disconnection may be effected. As these safety connections and operating means therefor form no part of the present invention, being covered in a companion case filed April 15, 1918, Serial No. 228,641½, they will not be further described herein.

The connecting devices, indicated at 17', between the pitman 16ᵇ and the wrist pin 17 are preferably of a character which permit the length of stroke imparted to the reciprocating member 19ᵃ to be changed or adjusted to meet varying conditions. At their lower ends, the rods 16ᵇ' are reduced to form shoulders 16ᶜ. The reduced ends of the pitman rods 16ᵇ' are provided with screw threads and extend through openings formed in a block 17ᵃ. The block 17ᵃ is carried by the outer end of the wrist pin 17, being preferably secured thereto by cap screws 17ᵇ. 17ᶜ indicates an abutment which may be adjustably secured to the reduced portions of the rods 16ᵇ'. The block 17ᵃ is arranged to strike against the shoulders 16ᶜ in the upward stroke of the crank and against the abutment 17ᶜ in the downward stroke of the crank. By adjusting the abutment 17ᶜ longitudinally of the rods 16ᵇ', the length of stroke imparted to the pitman by the crank 16ᵃ can thus be varied as desired. The adjusting devices between the abutment 17ᶜ and the rods 16ᵇ' may comprise nuts 17ᵈ, each mounted on the reduced end of the adjacent rod 16ᵇ'. Each nut is provided with a spiral 17ᵈ' arranged to mesh with a spiral gear 17ᵉ. The shaft of the gear 17ᵉ is provided with a crank 17ᵉ' by which it may be operated. The reciprocating member 19ᵃ is mounted to slide in guides 19ᵇ preferably provided on the front plate 7ᵇ. 20 indicates a cross bar or yoke that may be connected to the reciprocating member 19ᵃ by an inwardly projecting shaft or rod 20ᵃ. 21 indicates one or more rods connecting the cross bar 20 with the press-platen 15. I preferably provide two connecting rods 21 between the cross bar 20 and press-platen 15; these rods 21 being hollow, serve as conduits for the ingress and egress of air to and from the charging chamber 7. The lower ends of the rods 21 preferably extend through the press-platen 15 and form seats for valves 21ᶜ (Figs. 4 and 6). The valves 21ᶜ permit air to flow into the charging chamber as the platen rises to prevent the formation of a vacuum; on the other hand, when the platen 15 descends the valves 21ᶜ permit the air to escape from the charging chamber 7 to avoid its compression therein or the formation of air pockets in the bricks and the blowing of sand from the faces of the mold 14. Each valve 21ᶜ is positioned normally away from its seat, as shown in Fig. 4, but when the platen 15 contacts with the material, the latter causes the valve to close. As a result of this operation, each valve 21ᶜ is open during the first part of the downward stroke of the platen to let the air escape. The upper ends of the rods 21 may extend through the yoke or cross member 20 and be connected thereto by nuts.

The guides 19ᵇ preferably comprise a pair of side members 19ᵇ' which may be formed integrally with and extend laterally from the front face of the front plate 7ᵇ. 19ᶜ indicates a plate which is detachably connected, preferably by bolts 19ˣ, to the longitudinal front edges of the side members 19ᵇ' and forms therewith guide walls to slidably support the reciprocating member 19ᵃ.

The plates 19ᶜ and 7ᵇ are formed with slots 19ᶜ', 7ᵈ', respectively; the shaft 19 extends through the slot 19ᶜ', while the shaft 20ᵃ extends through the slot 7ᵈ'. The shaft 19 and stud 20ᵃ move longitudinally of the slots 19ᶜ', 7ᵈ', respectively, due to the operation of the plunger 19ᵃ.

From the foregoing description it will be seen that, as the press-platen 15 is operatively connected to and driven by the shaft 6, the wiper will force a charge of material into the space below the press-platen each time the latter rises. By proper angular adjustment of the wiper on the shaft 6, relative to the movement of the platen, it can be caused to coöperate therewith in an effective manner.

21 indicates a receiver onto which the empty molds are successively delivered or positioned ready to be moved forward to the mold filling station, as will be later set forth. The receiver preferably comprises a pair of plates 21ᵃ having flanges 21ᵇ on which the end blocks 14ᵇ of each mold rest. This construction leaves the space below the central portion of the mold open so that loose sand can drop therefrom and not accumulate on the receiver as would be the case if it extended entirely across the apparatus.

22 indicates a base or platform the rear portion of which is arranged below the die 13. It is spaced from the die 13 a sufficient distance to permit the brick molds 14 to be moved over the base and between said platform and the lower edge of the die 13. The rear portion of the platform 22 is arranged between the side plates 7ᵃ. The rear end of the base 22 is preferably provided with a pair of arms 22ᵇ which are adjustably and pivotally connected at or near their free ends to the frame plates 7ᵃ by bolts 22ᵃ. Certain of the bolts 22ᵃ extend through openings in the arms 22ᵇ and the plates 7ᵃ. The bolts 22ᵃ also project through suitable openings formed in the plates 21ᵃ and preferably serve to connect the latter to the arms 22ᵇ. These connecting bolts permit the rear end of the base to be raised and lowered or the entire base to be adjusted vertically. The base preferably comprises a plurality of sections as follows: a section 22ᶜ arranged below the die 13 to support each mold 14 at the filling position; a section 22ᵈ to support each mold 14 opposite a mold bumping mechanism, indicated as an entirety at 24; and a section 22ᵉ over which the molds travel to an inverting mechanism indicated as an entirety at 25.

As shown, the receiver 21 is spaced from the rear end of the base 22 to provide a passageway 26 through which the empty molds 14 are successively passed and delivered to the receiver 21. The passageway 26 is normally closed by a gate preferably comprising two spaced arms 27 fixed to a shaft 27ᵃ which is loosely mounted in lugs 27ᵇ extending rearwardly from the base section 22ᶜ. Each arm 27 carries a foot 27ᶜ to engage with the rear wall of the base section 22ᶜ and limit the downward movement of the arms 27. The gate arms 27 are arranged to be swung upwardly by a moving mold 14 (see dotted lines in Fig. 4), whereby the latter may pass through the passageway 26.

28 indicates as an entirety auxiliary means for supporting, in coöperation with the devices 22ª, the base or platform 22. The auxiliary supporting means 28 are preferably arranged directly below the press box 13 in order to take the thrusts due to the operation of the press platen 15 in forcing the material into the molds 14. The auxiliary supporting means 28 preferably comprise an angle cross member or beam 28ª rigidly secured at its opposite ends in any well known manner to the side plates 7ª; a set or sets of demountable devices 28ᵇ; and adjusting devices 28ᶜ between the transverse member 28ª and each set of the demountable devices 28ᵇ. Each of the demountable devices 28ᵇ preferably comprises a socket member 28ᵈ and an oval shaped rocker 28ᵉ which is adapted to rock within the socket of the member 28ᵈ. The rocker 28ᵉ is normally arranged with its major axis extending in a vertical direction so as to support the platform section 22ᶜ in the highest position. 28ᶠ indicates a rod extending through openings formed in the rockers 28ᵉ and having bearing at its opposite ends in elongated openings formed in the side plates 7ª. The openings in the rockers 28ᵉ and that portion of the rod 28ᶠ which extends therethrough, is of polygonal shape so that when the rod is rotated, it will rock the members 28ᵉ accordingly. The free end 28ᵍ of the rod 28ᶠ is shaped to receive a tool by means of which the rockers 28ᵉ can be moved angularly in either direction as shown in dotted lines in Fig. 27. When the rockers 28ᵉ are thus operated, the platform 22 will drop downwardly to increase the space between its upper surface and the lower open end of the die 13, and thereby permit the removal of any obstruction, such as a stone, which may have become wedged within the die or between it and a mold 14. Each adjusting device 28ᶜ preferably comprises a screw threaded rod which engages a nut 28ᶜ′ fixedly set in a suitable opening in the transverse member 28ª. By screwing in or out the bolts 28ᶜ, the sets of demountable devices 28ᵇ can be adjusted toward and from the die 13 to properly position the platform or base 22. The base section 22ᶜ preferably comprises a heavy casting to withstand relative high pressure as required in apparatus of this character. The upper surface of the section may be covered by a detachable plate so as to be conveniently replaced by a new plate at any time, it being important to maintain all points of this surface parallel with the lower surface of the die 13 that the molds will exactly fill the space between these parts.

The reciprocating feeder or mold pushout 23 serves to successively move the molds 14 from the mold receiving station 21 to the filling position immediately below the die 13. The feeder 23 may consist of a horizontally arranged plate extending across the space between the opposite inner walls of the frame members 1ᶜ. It may be provided with a plurality of strengthening ribs between which openings may be formed to make the feeder relatively light. The pushout 23 is provided along its opposite side edges with integral upper and lower guide walls 23ª between which are received inwardly extending guides 23ª′. The guides 23ª′ are preferably secured to the frame plates 1ᶜ by a plurality of bolts 23ᵇ. The guides or ribs 23ª′ serve to support the pushout 23 and to guide it longitudinally in a horizontal plane substantially coincident with the plane of the molds, whereby it may engage therewith and move them forwardly and relative to the die and then to the bumpers of the bumping mechanism 24 and the inverting and dumping mechanism 25. For the purpose of coöperation, the receiver 21 is arranged to receive and support a mold 14 as the pushout 23 is moved rearwardly but after it has passed the receiver 21. As the said pushout moves forward, it will engage with and move the mold 14 over the platform 22 the desired distance. In this connection it will be understood that when the pushout 23 engages with and moves a succeeding mold, the latter in turn pushes forward the mold or molds in front of it and thereby imparts step-by-step movement to all of the molds on the base or platform 22 to deliver them first to a position where they may be operated upon by the bumping mechanism 24 and then to the inverting and dumping mechanism 25, as will be later set forth.

23′ indicates a pair of spaced lugs preferably formed integral with and depending from the rear end of the pushout 23. 29 indicates a pitman or connecting rod. The front end of the pitman 29 is disposed between the lugs 23′ and is formed with a transverse opening 29ª to receive a pin 23ᶜ. The pin 23ᶜ is supported at its opposite ends in alined openings formed in the lugs 23′, whereby the pitman 29 is pivotally connected to the feeder or pushout 23. The pin 23ᶜ may be fixed to the lugs 23′ by a set screw 23ᶜ′. The rear end of the connecting rod 29 is pivotally connected to the free end of a crank 30 which in turn is fixed to and revolved by a transverse shaft 31. The connecting rod 29 is preferably formed of a plurality of members 29ᵇ which have right and left hand screw-threaded connection with each other to permit the rod to be lengthened or shortened to vary the stroke of the feeder 23 and thus regulate the positioning of the molds 14 below the die 13.

It will be understood from the construction just described that the shaft 31, the crank 30 and connecting rod 29, operate to reciprocate the feeder or pushout 23 forwardly and rearwardly. The shaft 31 is preferably arranged parallel to the shaft 2ᵍ, it being mounted in suitable bearings 31ᵃ in standards 31ᵇ on the base block 3. At one end of the shaft 31 is secured a gear 31ᶜ which meshes with the pinion 2ʰ'. The pinion 2ʰ' and gear 31ᶜ are proportioned relative to each other to insure proper speed of the shaft 31 and movement of the feeder 23 in coöperation with the press platen 15 and other parts of the apparatus.

32 indicates as an entirety automatic release devices or safety connections interposed between and connecting the shaft 31 and gear 31ᶜ together. The purpose of the devices 32 is to permit movement of the gear 31ᶜ relative to the shaft 31 to prevent breakage of any part or parts of the apparatus in the event the pushout 23 is stopped by an obstruction to it or the molds 14 in their forward movement. Of these devices, 32ᵃ indicates a casing fixed to one side of the gear 31ᶜ, concentrically of its axis. At one side the casing is provided with a tubular extension 32ᵇ to form a cylinder 32ᶜ, in which is slidably mounted a plunger 33. 34 indicates a spring interposed between the plunger 33 and an adjustable cap 34ᵃ for the outer end of the cylinder 32ᶜ. The spring 34 normally tends to push the plunger 33 in a direction toward the shaft 31. 35 indicates a cylindrical block or collar which is keyed in a well known manner to the shaft 31. At one side the block 35 is provided with a socket 35ᵃ to receive the inner end of the plunger 33. The opposite side walls of the socket 35ᵃ are inclined and the inner end of the plunger 33 is provided with inclined side walls to exactly fit the inclined walls of the socket 35ᵃ. As long as the inner end of the plunger 33 is maintained in the socket 35ᵃ, the gear 31ᶜ and shaft 31 will be connected together, whereby the former will transmit power to the latter; but when the resistance to the rotation of the shaft 31 becomes great enough to overcome the force of the spring 34 acting on the plunger 33, the latter will ride up one of the inclined walls of the socket and turn on the periphery of the block 35 without transmitting power to it. From the foregoing description it will be seen that the device 32 serve to normally connect the gear 31ᶜ and shaft 31 together, but in the event the push-out 23 is prevented from reciprocating, due to breakage or clogging of the molds 14, they permit the automatic release or detachment of these parts, so that the shaft 2ᵍ can continue to rotate. The cap 34ᵃ is preferably screw-threaded in the outer end of the cylinder 32c. This construction permits it to be adjusted to increase or decrease the tension of the spring 34 and thereby regulate the conditions under which the plunger 33 will automatically detach itself from the block 35.

The purpose of this construction is to relieve strains upon and prevent breakage in certain of the driving parts of the apparatus. While I have chosen to locate the devices 32 between the gear 31ᶜ and shaft 31, they could, if desired, be located between other parts of the power transmitting mechanism.

The bumping mechanism 24 is arranged between the die 13 and the dumping mechanism 25 to free or loosen the bricks from the mold walls ready for the dumping operation. The bumpers of the bumping mechanism 24 operate to bump each mold while it is on the section 22ᵈ of the support or base 22. Of the bumping mechanism, 24ᵃ indicates one or more transverse rods extending through a slide opening or openings 24ᵇ formed in the base or platform section 22ᵈ. 24ᶜ indicates a pair of bumpers fixed in any well known manner to the opposite ends of the rod or rods 24ᵃ and arranged in a plane slightly above the platform section 22ᵈ so as to engage each mold 14 as it moves thereover. Each bumper 24ᶜ preferably comprises a base 24ᵈ, a mold engaging member 24ᵉ and an adjustable intermediate member 24ᶠ to which the engaging member 24ᵉ is secured. The intermediate member 24ᶠ is preferably detachably as well as adjustably connected to the base 24ᵈ. For this purpose, the intermediate member 24ᶠ is provided with an elongated slot 24ᵍ adapted to receive a bolt 24ʰ having a clamping nut, which when tightened serves to connect the intermediate member 24ᶠ and base 24ᵈ together. The engaging surfaces between each intermediate member 24ᶠ and the adjacent base 24ᵈ are preferably provided with parallel interlocking ribs and grooves (see Fig. 10) which prevent relative movement between these parts when clamped together, but permit ready adjustment both longitudinally and transversely of the rods 24ᵃ, whereby the proper spacing of the bumpers 24ᶜ relative to each other and the platform section 22ᵈ may be effected. The bumpers 24ᶜ are reciprocated transversely of the platform section 22ᵈ by devices indicated as an entirety at 36. These reciprocating devices 36 may comprise a shaft 36ᵃ which preferably extends longitudinally of the apparatus. The shaft 36ᵃ may be mounted in a plurality of spaced bearings 36ᵇ supported by brackets 36ᶜ which are preferably secured to the adjacent side plate 7ᵃ, upright member 1ᶜ and sill 1ᵃ. At its rear end, the shaft 36ᵃ is provided with a bevel gear 36ᵈ that meshes with the bevel gear 2ⁱ. At its front end, the shaft 36ᵃ is provided with a crank arm 37 carrying at its free end a stud-shaft 37' on which may be pivotally mounted a polygonal block 37ª. 37ᵇ indicates a frame or box fixed to or formed integral with the adjacent bumper base 24ᵈ. On its rear side, the frame 37ᵇ is formed with a vertically extending, elongated groove or guide-way 37ᶜ having parallel side walls with which the block 37ª has slidable engagement. When the shaft 36ª is rotated to revolve the crank 37, the block 37ª slides upon and down in the groove 37ᶜ as the crank moves from its highest position to its lowest position and back again, but due to the engagement of the block 37ª with the side walls of the groove 37ᶜ during the movement of the crank, the frame 37 and bumping mechanism are reciprocated horizontally, being guided by the rods 24ª in the openings 24ᵇ. The speed of the shaft 36ª is such as to impart a quick reciprocating movement to the bumpers 24ᵉ in order to bump each mold back and forth between them with considerable force. The effect of this operation is to jar or knock the walls of each mold 14 with force sufficient to cause the loosening or freeing of the bricks from the walls thereof, so that when the molds are inverted by the dumping mechanism 25, the bricks will readily separate therefrom without any of their parts sticking to the mold walls, especially in the event the molds 14 have been previously sanded, as will be later set forth.

Each mold engaging member 24ᵉ is preferably pivoted loosely at 24ᵉ' to the adjacent member 24ᶠ, to swing upwardly, as shown in dotted lines in Fig. 4, and its rear wall is inclined or beveled. In the event either of the bumping members 24ᵉ happens to be in the path of movement of a mold 14 when the latter is being moved forwardly to the bumping position, the mold will engage the inclined wall of the member 24ᵉ and swing it upwardly without affecting its transverse movement; but as soon as the bumping member has cleared the mold, it will drop into operative position and engage the adjacent end thereof.

The crank 37 may be formed with a T-groove 37ˣ to receive the head of the bolt or stud-shaft 37', and permit its movement longitudinally of the groove 37ˣ to adjust the length of stroke imparted to the bumpers 24ᵉ. The bolt 37' may be fixed in its adjusted position by a suitable nut.

The shaft 36ª may be provided with two cranks 37 which extend in opposite directions relative to the axis of the shaft, and the T-groove 37ˣ may extend from end to end of both cranks. This construction permits the adjustment of the bolt to either side of the axis of the shaft whereby the direction of movement of the bumpers may be changed.

Through the adjustment of the bumpers 24ᵉ on the supporting member 24ᵈ and of the bolt or shaft 37' along the crank 37, I am enabled to so position the bumpers 24ᵉ in correlation with a mold moving forwardly relative to the base section 22ᵈ, that the latter can be positioned between the bumpers without danger of being bumped by the members 24ᵉ. These adjustments also permit me to so position and operate the bumping members 24ᵉ that either relatively hard or light blows may be imparted to the molds 14 as conditions may require.

No claim is made herein to the disclosed subject-matter relating to the mold bumping mechanism, the invention therein being claimed by me in my copending application filed April 15, 1918, Serial No. 228,640½.

The preferred form of mold dumping mechanism 25 includes a rotatable carrier 25' adapted to be moved step by step about its axis. The carrier 25' is provided with a series of spaced pockets 25ª, one of which is arranged to receive, during each period of rest of the carrier, a mold 14 which has been filled with material at the filling station or position and moved over the platform sections 22ᶜ, 22ᵈ and 22ᵉ by the pusher 23.

39 indicates as an entirety mechanism for supplying and delivering a pallet, indicated at 14', to each pocket 25ª of the carrier 25' for the purpose of placing a pallet 14' in position to receive the bricks as they are dumped from a mold 14. The pallet supplying and delivering mechanism 39 is preferably arranged to deliver a pallet 14' to each pocket 25ª substantially simultaneously with the delivery of a mold 14 thereto.

Of the pallet supplying and delivering mechanism, 39ª indicates a box or receptacle into which the pallets 14' are piled in superposed order. The receptacle 39ª is preferably supported at its opposite ends on a pair of frame members 39' slightly rearward of the carrier 25'. The frame members 39' rest upon the sills 1ª'. The receptacle 39ª may be provided with a bottom 39ᵇ and side walls 39ᶜ. 39ᵈ indicates supplemental end walls adjustably mounted in any well known manner on the bottom 39ᵇ and arranged to properly position the pallets 14' between the opposite ends of the receptacle. The lower edge of the front side wall of the receptable 39ª is cut away to form between it and the bottom 39ᵇ a slot 39ᵉ through which the lowermost pallet 14' is delivered by a thrust member or members 39ᶠ; also, the bottom 39ᵇ and rear side wall 39ᶜ are cut away, as shown at 39ᵇ', to form ways, through which the thrust members 39ᶠ move. The slot 39ᵉ along the front of the receptacle 39ª is of a size to permit only one pallet 14' to pass through it at a time. By this construction, the front wall of the receptacle 39ᶜ serves as an abutment for the pallets above the lowermost one while the latter is being fed forwardly. The free ends of the members 39ᶠ are preferably bifurcated to insure a positive engagement with the rear edge of each pallet 14′.

The thrust members 39ᶠ are preferably connected to and moved forwardly and rearwardly by a horizontally movable frame 43 which in turn may be connected, preferably by differential gearing 44, (Fig. 17) to and operated by the pusher or feeder 23. The movable frame 43 may comprise a pair of rods 43ᵃ each arranged at one side of the apparatus and supported in a box 43ᵇ which is formed with guide ways to slidably support the adjacent rod 43ᵃ. Each box 43ᵇ is preferably bolted to the adjacent side plate 7ᵃ of the charging chamber 7. At their front ends the rods 43ᵃ are connected together by a transverse bar 43ᵈ from which depend a pair of spaced arms 43ᵉ (Fig. 4). Each of the thrust members 39ᶠ may be pivotally connected at its rear end to the lower end of an adjacent arm 43ᵉ.

The differential mechanism 44 may comprise a pair or pairs of racks 44ᵃ, 44ᵇ, provided respectively on the pusher 23 and inwardly projecting walls 1ᶜˣ on the side plates 1ᶜ, and gears 44ᶜ each interposed between and meshing with a pair of racks 44ᵃ, 44ᵇ. The gears 44ᶜ are mounted on a transverse shaft 44ᵈ which extends through slots formed in the plates 1ᶜ and has bearing at its opposite ends in the rear ends of the rods 43ᵃ. When the pusher 23 is moved forwardly and rearwardly, it will cause the gears 44ᶜ to roll forwardly and rearwardly; and the gears in turn will move the rods 43ᵃ forwardly and rearwardly, but owing to the coöperation and engagement of the gears 44ᶜ with the racks carried respectively by the pusher and side plates 1ᶜˣ, the distance of travel of the rods 43ᵃ will be less than that of the pusher 23. This form of construction permits me to connect the pallet moving devices 43 directly with the reciprocating pusher 23 and at the same time provides for the proper delivery of a pallet 14′ from its supply receptacle 39ᵃ to an operative position above each mold 14 in a carrier pocket 25ᵃ and in correlation with its movement from the platform 22 onto the carrier 25′. Furthermore, the provision of a differential connection between the pallet moving devices 43 and the mold pusher 23 tends to simplify the construction and provide compactness in arrangement of certain parts of the apparatus.

45 indicates sets of devices which cause the thrust members 39ᶠ to positively engage the lowermost pallet 14′ in the receptacle 39ᵃ. Each set of devices 45 preferably comprises a member 45ᵃ extending laterally from the adjacent thrust member 39ᶠ and an operating device 45ᵇ provided with a foot 45ᶜ having inclined or cammed front and rear walls. The operating device 45ᵇ is pivotally mounted on a shaft 45ᵈ mounted in the side walls 46 of a box 46ᵃ fixed to the rear wall 39ᶜ of the receptacle 39ᵃ. The bottom plate 46ᵇ of the box 46ᵃ is preferably disposed in a plane slightly below the bottom 39ᵇ and serves to support and guide the free end of the feeders or thrust members 39ᶠ rearwardly and also forwardly, except when elevated into engagement with a pallet 14′. The foot 45ᶜ of the operating device 45ᵇ is arranged in the path of movement of the laterally extending member 45ᵃ. In the forward movement of the thrust member or feeder 39ᶠ, the member 45ᵃ will therefore engage the foot 45ᶜ and ride up the rear inclined wall thereof, as shown in dotted lines in Fig. 13, thus elevating the thrust member 39ᶠ about its pivot into position to engage the rear edge of the lowermost pallet 14′. In the rearward movement of the thrust member 39ᶠ, the laterally extending member 45ᵃ will engage the front inclined wall of the foot 45ᶜ and cause the operating member to swing upwardly, as shown in Fig. 16; as a result of this operation, the foot 45ᶜ will be moved out of the path of the member 45ᵃ. The laterally extending member 45ᵃ is preferably provided with front and rear inclined walls for engagement with the foot 45ᶜ. 45ᵉ indicates a spring, preferably coiled about the shaft 45ᵈ; one end of the spring is fixed to the box 46ᵃ and its opposite end is connected to the operating member 45ᵃ for the purpose of yieldingly maintaining the latter against the bottom 46ᵇ.

47 indicates one or more devices arranged on the bottom 39ᵇ near the rear side of the receptacle 39ᵃ and adapted to support the rear edges of the pallets 14′ above the bottom 39ᵇ, as shown in Figs. 13 and 14. 47ᵃ indicates a pusher fixed in any well known manner to each feeder 39ᶠ. Each pusher 47ᵃ has an inclined wall 47ᵇ and an abutment 47ᶜ. The pusher 47ᵃ is so positioned on the feeder 39ᶠ that in the forward movement of the latter, to feed a pallet 14′ to a pocket in the carrier, it will engage the next lowermost pallet 14′ and push it beyond the front ends of the supporting devices 47, where it will drop onto the bottom 39ᵇ in position to be actuated by the thrust members 39ᶠ in the succeeding forward movement thereof. The pusher 47ᵃ not only serves to partially feed the lowermost pallet 14′ forwardly, but serves also to separate it from the pallets above it in order that the feeders 39ᶠ will engage but one pallet at a time. The abutments 47ᶜ are of less height than the thickness of a pallet so that but one of the latter will be engaged. In the forward movement of the feeder 39ᶠ, the inclined wall 47ᵃ moves underneath and engages the pallets which ride up the inclined wall. By this operation the lowermost pallet is elevated into position to be engaged by the abutment 47ᶜ. From the foregoing description it will be seen that the supports 47 and pushers 47ᵃ coöperate to effect a partial feeding and the separation of the lowermost pallet 14′ from the pile of pallets in the box 39ᵃ to insure the delivery by the feeders 39ᶠ of but one pallet 14′ in each forward movement thereof.

The carrier 25′ may comprise a pair of spaced annular members 25ᵇ connected to a shaft 25ᶜ. The shaft is supported at its opposite ends in bearings in the frame members 39′. The mold receiving pockets 25ᵃ are uniformly spaced around the shaft 25ᶜ and supported by and between the members 25ᵇ, each pocket 25ᵃ being preferably arranged substantially diametrically opposite one of the other pockets 25ᵃ on the carrier. Each annular member 25ᵇ preferably comprises a casing. This casing may be formed by a cup member 25ᵇ′ and a plate 25ᵇˣ bolted to the cup member in any suitable manner. The plate 25ᵇˣ is preferably provided with a hub 25ˣ secured to the shaft 25ᶜ in any well known manner. Each pocket 25ᵃ preferably comprises pairs of opposing plates 25ᵈ, 25ᵈ, and 25ᵉ, 25ᵉ, between which are delivered a mold 14 and a pallet 14′, the latter by the pallet delivery devices 39, as shown in Figs. 22 and 24. The plates 25ᵈ, 25ᵈ, are secured to a transverse rod 25ᵈ′; the plates 25ᵉ, 25ᵉ, are secured to a transverse rod 25ᵉ′; and the opposite ends of said rods 25ᵈ′ 25ᵉ′, extend through elongated alined openings 25ᶠ formed in the plates 25ᵇˣ, and are connected to slide blocks 25ᵍ within the annular members 25ᵇ; the rods 25ᵈ′ being fixed or keyed to the adjacent blocks 25ᵍ and the rods 25ᵉ′ being rotatably mounted in the adjacent blocks 25ᵍ. Each plate 25ᵈ, 25ᵉ, is secured to the adjacent rod 25ᵈ′, or 25ᵉ′, by clamps 25ᵗ′, which preferably permit adjustment of the plate thereon. 25ʰ indicates pairs of alined guides arranged to slidably support the guide blocks 25ᵍ. The guides 25ʰ are preferably formed integral upon the inner face of each plate 25ᵇˣ. The guides 25ʰ and blocks 25ᵍ serve to movably support the opposite ends of the rods 25ᵈ′, 25ᵉ′, and permit the pocket plates 25ᵈ, 25ᵉ, to move away from each other, in order that the bricks c and the adjacent pallet 14′ can be separated from a mold after they have been discharged therefrom.

48 indicates a mechanism which operatively connects together the slide blocks 25ᵍ at each end of a pair of rods 25ᵈ′, 25ᵉ′, whereby the movement of one rod and pair of plates mounted thereon will be transmitted to the other rod and pair of plates. Referring to one of these connecting mechanisms (see Fig. 23), 48ᵃ indicates a pair of guide walls provided on the inner face of the adjacent plate 25ᵇˣ and preferably extending at right angles to the guides 25ʰ. 48ᵇ indicates a block arranged to slide between the guides 48ᵃ. 48ᶜ indicates a link having pivotal connection at its opposite ends with the slide block 25ᵍ for the adjacent rod 25ᵉ′ and the inner end of the slide block 48ᵇ. 48ᵈ indicates a link interposed between the outer end of the slide block 48ᵇ and the slide block 25ᵍ for the rod 25ᵈ′. When these parts are constructed in this manner, the rod 25ᵉ′ will be able to move a greater distance than the other rod. From the foregoing description it will be seen that the slide blocks 25ᵍ are so connected together that when one rod moves lengthwise of the adjacent slots 25ᶠ, the other rod will be moved in the opposite direction.

From Figs. 22, 23 and 24 it will be noted that each mold 14 is delivered to a pocket 25ᵃ with a pallet 14′ on top thereof and when the carrier 25′ is rotated a one half turn about its axis, the mold 14 is inverted so that the bricks c will fall onto the pallet 14′, as shown in dotted lines in Fig. 24. The weight of the bricks c and pallet 14′ on the pocket plates 25ᵉ will cause the rod 25ᵉ′, to which said plates are connected, to move downwardly through the slots 25ᶠ, the rod being guided by the blocks 25ᵍ and guides 25ʰ; and these parts acting through the connecting mechanisms 48 will cause the opposite pair of pocket plates 25ᵈ to move upwardly. In order that the mold 14 may be carried upwardly with the plates 25ᵈ, I secure to each rod 25ᵈ′ a pair of auxiliary plates 25ⁱ. These plates 25ⁱ have inwardly extending lips or flanges 25ᵏ which engage under the opposite ends of a mold 14 so as to lift it with the rod 25ᵈ′. The purpose of providing for movement of either or both of the pocket plates 25ᵈ, 25ᵉ, relatively to each other, is to cause the separation of each mold 14 from the series of bricks c when or after the latter are dumped from the mold, and thus permit the subsequent removal of the bricks from the carrier 25′ to some discharge device, such as indicated at 51 in Figs. 23 and 24; this latter operation is effected immediately after the pairs of pocket plates 25ᵈ, 25ᵉ, have moved away from each other, as will be later set forth.

49 indicates devices for moving the pairs of pocket plates 25ᵈ, 25ᵉ, together ready to receive another mold 14. The devices 49 preferably comprise a pair of cam-shaped guide-ways 49ᵃ and pairs of elements 49ᵇ, movable in the guide-ways 49ᵃ, one pair of elements for each pocket 25ᵃ, and each pair connected to the adjacent pocket separating mechanism 48. Each guide-way 49ᵃ is preferably formed by a side wall 49ᶜ which is mounted within the cup member 25ᵇ′. The wall 49ᶜ may be provided with a hub or collar 49ᵈ which surrounds the adjacent bearing for the shaft 25ᶜ, being adjustably fixed thereto by a set screw 49ᵉ. As the collar 49ᵈ extends through the annular cup member 25$^{b'}$ (to permit access to and operation of the set screw 49$^e$), it forms a bearing or shaft for the latter to rotate on. Each movable element 49$^b$ may comprise a slide device, such as a roller 49$^f$, mounted on an extended end of the pivot pin between the link 48$^c$ and the slide block 48$^b$.

As will be understood from Figs. 23, 24 and 25, the guide-ways 49$^a$ are enlarged at 49$^{a'}$ to permit lateral movement of the rollers 49$^f$ which in turn permit endwise movement of the slide blocks 48$^b$, due to operation of the pocket plates 25$^e$ under the load of a series of bricks $c$ at the position of discharge thereof; but that from such enlarged portions 49$^{a'}$ the guide-ways have inwardly curved sections 49$^g$ eccentric to the axis of the carrier 25$'$, and concentric sections 49$^h$. The effect of the eccentric sections of the guide-way 49$^a$, acting on the rollers 49$^f$, is to draw together into normal position the pairs of pocket plates 25$^d$, 25$^e$, ready to receive a filled mold, while the effect of the concentric sections is to maintain the pocket plates 25$^d$, 25$^e$, in normal position until the carrier 25$'$ has rotated to the position of discharge for the bricks.

I prefer to provide a slide device 49$^b$ for each connecting mechanism 48 so as to insure positive operation of the pocket plates 25$^d$, 25$^e$, constituting each pocket 25$^a$, without any binding at either end of their supporting rods.

50 indicates devices for discharging or removing the bricks $c$ from the apparatus together with the pallets 14$'$ on which they rest. One of these devices is arranged to operate immediately after each series of bricks has been dumped and the pocket plates 25$^d$, 25$^e$, constituting a carrier pocket 25$^a$, have moved away from each other. The discharge devices 50 are preferably carried by the carrier 25$'$. They are operated by the forward movement of a mold 14 as it is delivered to a carrier pocket 25$^a$. The devices 50 are preferably arranged in pairs, the devices constituting a pair being spaced widely apart on the shaft 25$^c$, as shown in Fig. 22, so as to engage a pallet 14$'$ near its opposite ends. Each operating device 50 may be arranged to be moved endwise by a mold, to discharge a pallet, in a direction parallel with the plane in which the mold moves onto the carrier 25$'$ so as to be positioned for engagement by a succeeding mold, whereby endwise movement of the device in the opposite direction will cause the discharge of a succeeding pallet. This form of construction is advantageous in that it simplifies the construction and reduces the number of required parts, since one pair of devices 50 by their movement in opposite directions can be used to discharge a pallet for the bricks of a mold at one side of the carrier and the pallet for the bricks of the mold at the opposite side of the carrier when the latter mold arrives at the position of discharge. Each device 50 preferably comprises a rod 50$^a$ and heads or engaging members 50$^b$ carried at its opposite ends. Each rod is mounted to slide endwise in a guide opening 25$^{c'}$ extending transversely through the hub 25$^x$ formed integral with the adjacent casing plate 25$^{bx}$. The heads 50$^b$ are so shaped and disposed that one will be in the path of movement of a mold delivered to the mold receiving side or position of the carrier 25$'$, and the other will be in position to engage the pallet 14$'$ adjacent the mold then at the opposite side of the carrier. As a result of this construction and arrangement, the operation of delivering a mold 14 into a pocket 25$^a$ will cause the adjacent pair of rods 50$^a$ to slide endwise to the position shown in Fig. 24, and through the heads 50$^b$ at the opposite end of the rods 50$^a$, slide the pallet 14$'$ positioned below the inverted mold 14, at the delivery side of the carrier 25$'$ horizontally onto the support 51. Thus it will be seen that a pallet 14$'$ with a series of bricks $c$ thereon will be discharged from one pocket in the carrier 25$'$ simultaneously as a filled mold 14 and a pallet 14$'$ are delivered to another pocket. It will be understood that, since the pairs of pocket plates 25$^d$, 25$^e$, constituting each pocket 25$^a$, are separated as soon as or just before the pocket arrives at the discharge position, the mold 14 will be lifted above the adjacent heads 50$^b$ prior to the endwise movement of the rods 50$^a$ and permit the latter to freely move endwise as just described.

The rods 50$^a$ are arranged to freely slide in the guide openings 25$^{c'}$ in either direction. When moved in one direction to discharge a pallet 14$'$, they remain in that position until the heads 50$^b$, which have engaged with and discharged the adjacent pallet 14$'$, move around with the carrier 25$'$ to the mold receiving position where they will be engaged by a mold 14 and moved in the opposite direction to discharge the pallet which at that instant is at the opposite side of the carrier 25$'$.

The rods 50$^a$ of one pair are slightly offset from the rods of another pair, as will be understood from Fig. 22; and the pocket plate supporting rods 25$^e$ for each pocket 25$^a$ are provided with U-portions to permit proper positioning and free movement of the heads 50$^b$.

The support 51, which receives a pallet 14$'$, may consist of an inclined chute having rollers which convey the pallets to some suitable point of delivery.

The carrier 25$'$ is rotated step by step by any suitable power transmitting devices, such, for example, as indicated as an entirety at 40, to provide intervals of rest during which molds 14 and pallets 14$'$ are delivered to the pockets 25$^a$ successively and the pallets discharged successively therefrom. Of these devices, 40$^a$ indicates a shaft mounted in bearings provided in the side plates 7$^a$. One end of the shaft 40$^a$ extends through the adjacent side plate and has fixed to it two sprocket wheels 40$^b$, 40$^{b'}$. 40$^c$ indicates another shaft to which is secured a sprocket wheel 40$^{c'}$ in alinement with the sprocket wheel 40$^{b'}$. The shaft 40$^c$ extends through the adjacent frame member 39' and has bearing in a pillow block 39''. 40$^d$ indicates a drive chain leading around the sprocket wheel 40$^b$ and a sprocket 41 fixed to the shaft 31, and 41' indicates a drive chain extending around the sprocket wheels 40$^{b'}$, 40$^{c'}$, these parts serving to continuously drive the shaft 40$^c$ from the shaft 31.

41$^a$ indicates a pinion fixed to the shaft 40$^c$. The pinion 41$^a$ is arranged in line with the adjacent annular member 25$^b$, which is provided on its perimeter with teeth 41$^b$ adapted to mesh with the teeth on the pinion 41$^a$. As will be understood from Figs. 22 and 23, the pinion or gear 41$^a$ is provided with teeth 41$^{a'}$ only around a portion of its perimeter, the remaining part thereof being plain, as shown at 41$^{a''}$, and that the teeth 41$^b$ on the annular member 25$^b$ are arranged in sections with a plain curved portion 41$^{b'}$ between adjoining sections. It will also be seen that the shaft 40$^c$ and gear 41$^a$ thereon rotate continuously, but through the coöperation of the teeth 41$^{a'}$ and plain section 41$^{a''}$ of the gear 41$^a$ with the teeth 41$^b$ and curved portions 41$^{b'}$ on the annular member 25$^b$, the latter is rotated step by step.

41$^c$, 41$^d$, indicate dogs adapted to lock the carrier 25' against movement in either direction when at rest between its step by step movements. The dogs 41$^c$, 41$^d$, are mounted on pivot pins 41$^{c'}$ which are preferably supported by the side frame 39' adjacent to the pinion 41$^a$. Each of the dogs 41$^c$, 41$^d$, is provided with a counterbalancing weight 41$^{d'}$ which tends to swing the nose of the dog upwardly and into engagement with the perimeter of the adjacent annular member 25$^b$.

25$^v$ indicates a series of recesses having shoulders arranged to be engaged by the dog 41$^c$, and 25$^{v'}$ indicates a series of recesses forming shoulders adapted to be engaged by the dog 41$^d$. The series of recesses 25$^{v'}$ is preferably arranged adjacent the outer edge of the annular member 25$^b$ so as to be out of alinement with the dog 41$^c$. The dogs 41$^c$, 41$^d$, extend toward each other, as shown in Fig. 23, and the shoulders of one series of recesses are arranged opposite to the shoulders of the other series of recesses so that through the coöperation of the dogs and shoulders with which they engage, the carrier 25' will be locked against movement in either direction. The nose of the dog 41$^d$ is arranged to prevent backward movement of the carrier 25'. When the carrier 25' is rotated in the forward direction the dog 41$^d$ rides on the perimeter of the adjacent annular member 25$^b$. 41$^e$ indicates a device which automatically engages the dog 41$^c$ at predetermined intervals to release it from the shoulder of the recess 25$^v$ which it has engaged, to permit forward movement of the carrier to the next position of rest. The device 41$^e$ is preferably carried by the pinion 41$^a$ and extends laterally from one side thereof into position to engage the counterbalance of the dog 41$^c$ each time the pinion 41$^{a'}$ for the dog 41$^c$ each time the pinion makes one revolution. The device 41$^e$ may consist of a roller mounted on a stud shaft 41$^{e'}$ which is fixed to the outer side of the pinion 41$^a$. The device 41$^e$ is arranged in juxtaposition to the front end of the series of teeth 41$^{a'}$ so as to release the dog just prior to the engagement of the teeth with the next section 41$^b$ of teeth on the annular member 25$^b$. After the device 41$^e$ has operated and moved past the dog 41$^c$, the weight of its counterbalance 41$^{d'}$ will swing its nose back to normal position ready to engage the shoulder of the succeeding recess, whereupon the carrier 25' will be stopped with a mold receiving pocket 25$^a$ in proper position to receive a mold 14 and the pocket diametrically opposite thereof in position to permit the discharge of a pallet 14', as already described. As the perimeter of the annular member 25$^b$ between the recesses 25$^v$ is smooth, the nose of the dog 41$^c$ will, following its release from the shoulder of one recess, freely ride on the annular member 25$^b$ until it swings in to the succeeding recess 25$^v$ and engages the shoulder thereof. The pinion 41$^a$ and annular member 25$^b$ which coöperates therewith to drive the carrier 25' are constructed and properly correlated to impart step by step movements to the carrier with properly timed rest periods between such movements in coöperation with the movements of other parts of the apparatus; and the interlocking dogs and shoulders co-act with these driving devices to stop the carrier 25' at predetermined positions and prevent movement thereof in either direction.

53 indicates a chute arranged in the pit B below the dumping mechanism 25 and adapted to receive the empty molds which are discharged from the carrier 25'. The chute 53 is formed by the curved sections 1$^e$ of the supplemental plates 1$^{e'}$. As shown in Figs. 2 and 4, the opposite edges of each section 1$^e$ diverge from each other and are provided with inwardly extending flanges 53$^a$ which form the upper and lower walls of the chute. As will be understood from Figs. 22, 23 and 24, the pockets 25$^a$ of the carrier 25' are open along their opposite longitudinal sides to permit not only the delivery of the molds to them on the one hand, as already described, but on the other hand, the discharge of the molds by gravity from the pockets 25ª after the bricks have been dumped and the adjacent pallet 14' moved onto the support 51. The gravity discharge of the empty molds 14 takes place during the movement of the carrier 25' from the brick discharging position to the mold delivery position; such discharge is effected as soon as the mold is enabled to slide downwardly and forwardly relative to the axis of the carrier 25' under the influence of gravity. 53' indicates a pair of guides which are secured to the front flanges 53ª and extend upwardly from the chute. The upper ends of the guides 53' are curved on an arc concentric to the axis of the shaft 25ᶜ and serve to maintain each mold in its pocket until the mold arrives at a position above the open end of the chute 53, as shown in Fig. 4, whereupon the mold will slide out of its pocket by gravity. The open end of the chute 53 is arranged to receive each mold as it drops. 53ᵈ indicates one or more spring guards which project into the mouth of the chute 53 and serve to deflect the molds against the frontmost flanges 53ª and to prevent them from turning upside down as they drop into the chute 53.

54 indicates as an entirety mechanism for sanding the empty molds 14 during their movement from the chute 53 back to the receiver 21 in position to be fed forwardly. The sanding mechanism 54 is preferably arranged in the pit B in order to simplify the construction of the apparatus as an entirety and economize on floor space. Of this mechanism, 54' is a receptacle or box for holding loose sand. The receptacle is preferably formed by a bottom plate 54ª extending between the plates 1ᶜ' and extensions 1ᵈ thereof. The plate 54ª may be secured to flanges formed integrally on the plates 1ᶜ'. 57 indicates a pair of endless chains, which serve to move the molds 14 through the sand holding chamber 54'. Each chain is preferably provided with projecting members 57ᵈ, which are spaced along the chains, the member on one chain alining with a member on the other chain. The purpose of the projecting members 57ᵈ is to engage with the molds delivered from the chute 53 and move them rearwardly through the sand holding receptacle 54' and upwardly into the passageway 26. The endless chains 57 extend from the discharge end of the chute horizontally rearwardly, as shown in Fig. 4. At their forward ends, the chains 57 run around sprocket wheels 57ᵇ keyed to a transverse shaft 57ᶜ, and at their rear ends run around sprocket wheels 57ᵇ' fixed to the shaft 40ª. The sprocket wheels 57ᵇ are preferably fixed to the shaft 57ᶜ so as to rotate the latter for a purpose to be later described. The opposite ends of the shaft 57ᶜ may be loosely supported in suitable bearings provided in standards 1ᶠ which may be formed integral with the plates 1ᵈ. The bottom 54ª curves upwardly and rearwardly concentrically to a shaft 54ᵇ to invert the molds to permit the loose sand to fall therefrom into a succeeding mold 14 and the receptacle 54'. 54ᶜ indicates guide wheels which coöperate with the curved wall 54ª to guide the molds 14 upwardly and rearwardly to invert them. The wheels 54ᶜ are preferably loosely mounted on the shaft 54ᵇ. I preferably provide two pairs of wheels as shown in Fig. 5. 54ª' indicates a pair of devices leading from the discharge end of the chute to the front edge of the bottom 54ª and serving to support the propelling members or chains 57. The devices 54ª' preferably comprise channel members, the side walls of which extend to a plane above the chains 57, but below the free ends of the mold engaging members 57ᵈ. The devices 54ª' may be supported by transverse members 54ᵈ. The purpose of the devices 54ª' is to take the strains and blows due to the discharge of the empty molds from the chute 53, but as they are arranged below the upper edges of the projecting members 57ᵈ, they permit the latter to engage the molds and move them forwardly. The bottom 54ª and guide wheels 54ᶜ are spaced from each other a sufficient distance to permit the molds 14 and chains 57 to move between them, as shown in Fig. 4. 55 indicates a pair of guides fixed to and projecting inwardly from the opposite side walls of the plates 1ᶜ'. The guides 55 extend rearwardly to the sand holding receptacle 54' and are inclined downwardly. They serve to engage the upper edges of the molds 14, as they enter the receptacle 54' to prevent them from riding up on the surface of the sand.

56 indicate devices which operate to guide the chains 57 from the sprockets 57ᵇ' to the sprockets 57ᵇ and to take up any slack which may occur in the chains due to the running of the apparatus without molds 14 or with a less number of molds than can be accommodated in the machine. Of these devices, 56ª, 56ᵇ, indicate pairs of sheave wheels around which the chains 57 run in the return direction. The wheels 56ª are mounted on a shaft 56ª', the opposite ends of which are supported in the side plates 1ᶜ' (Fig. 2); the wheels 56ᵇ are mounted on a shaft 56ᵇ' which is carried by the free end of a swingable frame 56ᶜ. The frame 56ᶜ is pivoted on the shaft 56ª'; its free end is swingable outwardly and downwardly under the influence of a weighted arm 56ᵈ to keep the chains taut. The arm 56ᵈ is rigidly connected to the frame 56ᶜ and carries a weight 56ᵈ' which is preferably adjustable longitudinally of the arm 56ᵈ. When the chains are driven without molds 14 being run through the apparatus, the chains will be drawn up into engagement with the guide wheels 54ᶜ, but this shortening of the upper run between the sprockets 57ᵇ and 57ᵇ' will be compensated for by the downward movement of the frame 56ᶜ. The wheels 54ᶜ are arranged in pairs on the shaft 54ᵇ to engage and guide the chains 57 under such conditions, but permit the projecting members 57ᵈ to move between them.

59 indicates a guide which receives the empty molds 14 from the sanding mechanism 54 and guides them upwardly through the passageway 26. The guide 59 preferably comprises a pair of curved plates 59ᵃ which may be arranged adjacent to and fixed in any well known manner to the opposite frame members of the apparatus. The plates are preferably curved on an arc substantially concentric to the axis of the shaft 40ᵃ and coöperate with flanges 21ᵇ' depending from the receiver 21 to form the passageway 26.

60 indicates a sweeper fixed to and revolved by the shaft 40ᵃ. The sweeper 60 preferably comprises a pair of arms separated from each other and arranged near opposite ends of the shaft 40ᵃ but inside of the frame members 7ᵃ. The arms 60 are arranged to engage each mold 14 as it is delivered by the mold moving members 57 from the sanding mechanism 54 onto the guide plates 59ᵃ and move it longitudinally of the latter and up through the passageway 26 past the gate 27. The sweeper 60 moves each mold through the passageway 26 onto the receiver 21 in position to be moved forward by the mold push-out 23. The sweeper arms 60 may be fixed to the shaft 40ᵃ in any well known manner, but are arranged thereon, angularly, to coöperate with the mold moving members 57 and mold push-out 23.

65 indicates devices which control the delivery of the empty molds from the chute 53 to the mold return means 57. In practical operation it has been found desirable to use a greater number of molds 14 at one time in the apparatus than is sufficient to make the machine operate to full capacity and provide for the delivery of an empty mold 14 at the filling position below the die 13, each time the push-out 23 moves forwardly. I therefore provide at some point in the cycle of movement of the molds through the apparatus a holder which will receive and hold a plurality of molds 14 without affecting the step by step operation of the various parts of the apparatus and the successive filling, bumping, dumping and discharging of the molds, so that in the event one or more of the molds break, get out of position, obstruct the movement of succeeding molds or affect the operation of any part of the machine, such mold can be immediately removed and the machine will still have a full quota of molds. The chute 53 lends itself for this purpose, it being adapted, on account of its length, to receive the empty molds as they are discharged from the dumping mechanism 25 and to permit a plurality of them to accumulate thereon while the devices 65 regulate and control the discharge of the empty molds from the chute 53 one by one onto the chains 57 and then to the sand holding receptacle, thereby insuring that the molds 14 will follow one another in regular spaced order and be delivered one by one upon the receiver 21 without crowding.

Of these regulating devices, 65ᵃ indicates a pair of rockers, each having a lip 65ᵇ, fixed to a shaft 65ᶜ, and means, indicated at 66, for rocking the shaft 65ᶜ. The rockers 65ᵃ are arranged near the rear or discharge end of the chute 53 and near opposite sides of the latter. The front ends of the rockers are normally arranged to extend above the lower guide walls of the chute 53, as shown in Fig. 4, so that the molds 14 can ride onto them into engagement with the lips 65ᵇ. The rockers 65ᵃ are arranged to be oscillated by the shaft 65ᶜ. Each time the shaft 65ᶜ is rocked in one direction, the lips 65ᵇ are moved to a position below the walls of the chute, whereupon the adjacent mold will slide forwardly, due to its own weight, onto the receiving members 54ᵃ'; while the rear ends of the rockers will move upwardly above the lower walls of the chute and prevent forward movement of the remaining molds in the chute. The means 66 for rocking the shaft 65ᶜ may consist of an eccentric 66ᵃ fixed to the shaft 57ᶜ and rotating in the collar 66ᵇ. The collar 66ᵇ is provided with an arm 66ᶜ which is pivoted at its free end in any desired manner to a transverse rod 66ᵈ. The opposite ends of the rod 66ᵈ are connected in any well known manner to arms 65ᵃ' which depend from the rockers 65ᵃ. 65ᵉ indicates sets of idlers loosely mounted on shafts 65ᶠ. The idlers 65ᵉ are arranged in front of the rockers 65ᵃ to guide the molds 14 onto the receiving members 54ᵃ'.

In connection with the operation of the apparatus, it will be understood that the step by step movements of the carrier 25' are correlated with the movement of the mold push-out so that during the forward movement of the latter, the carrier is at rest to permit the delivery thereto at one side of a mold and a pallet and also the discharge therefrom at its opposite side of a pallet and series of bricks; likewise, the mold controlling and regulating devices 65 are arranged to operate at the proper time to release a mold for delivery to the mold conveying chains 57 after one pair of moving elements 57ᵈ has passed but before the next pair passes the rear end of the chute 53; also, the sweeper arms 60 are arranged for coöperation with the movement of the molds from the guides 54ᶜ to the guides 59 and with the push-out 23.

Starting with a mold 14 which has been delivered to the receiver 21, as shown in Fig. 4, from this position the mold is pushed forward by the push-out 23 over the gate 27 to a predetermined position on the base 22 in registry with the die 13. When the mold is in this position, the press-platen 15 moves downwardly and forces the material into the mold. The press-platen then returns upwardly. In the meantime, the mold push-out 23 has returned to its rear position ready to move another mold forward. In the next forward movement of the mold pushout the succeeding mold 14 is moved forwardly to the predetermined position for filling and it in turn engages with and moves the first mold forwardly along the platform 22. This operation is repeated, so that each time a mold is pushed forwardly to the filling position, the molds in front thereof are moved forwardly over the platform or support 22 to the dumping mechanism 25. As the molds come to a position of rest in line with the bumping mechanism 24 they are bumped thereby sidewise or transversely of the support, the effect of which is to cause the bricks to become loosened from the walls of the mold. As the forwardmost mold on the support 22 is moved onto the carrier 25', the pallet delivery mechanism 39 operates substantially simultaneously to move a pallet 14' with the mold onto the carrier 25'. After the mold and pallet have been delivered to the carrier 25', the driving mechanism therefor rotates the carrier one step to bring the succeeding pocket 25ᵃ into position to receive the succeeding mold and pallet, this operation being repeated each time a pocket 25ᵃ arrives at the receiving position. As each pocket passes the vertical and commences to descend in its movement with the carrier, the bricks in the mold 14 carried by the pocket are dumped onto the pallet 14', the weight of which causes the pocket members to move away from each other to separate the mold from the bricks. This operation is completely effected as the pocket arrives at the discharge position. When the carrier pocket 25ᵃ reaches this latter position, the mold push-out, acting through the molds on the support 22, moves the then forwardmost mold 14 onto the carrier, as just described, which mold in turn, through the engagement of the pallet discharge devices 50 with the pallet carrying the dumped bricks at the discharge position, moves it onto the discharge device 51. As the carrier again rotates to bring the pocket, from which the dumped bricks have just been removed, to the receiving position, the empty mold slides outwardly and downwardly into the chute 53, the walls of which guide the mold rearwardly until it is arrested by the lip 65ᵇ of the control mechanism 65. The rockers 65ᵃ then operate about the shaft 65ᶜ and release the mold 14 which slides forwardly over the idlers 65ᵉ onto the buffer 54ᵃ′ where it is engaged by a pair of arms 57ᵈ carried by the endless chains 57. The arms 57ᵈ conduct the mold rearwardly through the sand in the receptacle 54′, thus causing the sand to flow into the molds. The endless chains 57 continue to move the molds forwardly and then upwardly around the guide rollers 54ᶜ, which invert or turn the molds over. As a result of this construction, the loose sand is dumped from the molds. From the guide rollers 54ᶜ the molds are directed onto the curved guides 59ᵃ at which time they are engaged by the sweepers 60 and moved longitudinally of the guides 59ᵃ and then upwardly through the passageway 26. The sweepers 60 coöperate with the gate 27 and depending flanges of the receiver 21 to return the molds to upright position as they are delivered to said receiver 21.

It will be understood that the power transmitting devices and connections with the press-platen and devices for operating, moving and controlling the molds, are arranged to effect coöperation of the several parts of the apparatus with each other, as just described, so that the molds are moved, controlled and guided first to the position for filling, then to the position for bumping, then, in coöperation with pallet feeding mechanism, to the inverting and dumping mechanism, then through the sanding apparatus and finally returned into position to be engaged by the mold push-out. I am enabled therefore to provide an apparatus wherein a series of molds are caused to move through a cycle to the end that bricks may be made in and then dumped from the molds and the latter sanded and returned for filling automatically and with minimum labor and expense; furthermore, as the filling, bumping, dumping and sanding mechanisms are arranged in the same vertical plane, I am enabled to provide an apparatus which is compact as well as simple in construction.

It will be noted that each of the molds is a closed bottom mold, that is, it has side and end walls and a bottom wall. The surface of each of these walls which is to be engaged by the clay or mud must be coated or suitably sanded to assist in the separation of the bricks in perfect condition from the molds. In order to properly sand the molds, I cause each mold to enter the sand box with its open side uppermost, so that the sand may enter the mold cavities and engage the inner surfaces of the sides, bottom and ends thereof; then, in order to get the surplus sand out of the mold cavities, I find it desirable to invert the mold so as to dump out the sand and cause the surplus sand to fall back into the sand box. Having inverted the mold for this purpose, in order to locate it properly on the receiver 21 with its open side uppermost, I must return it from inverted position above the sand box to upright position on the receiver 21. This I do by causing the mold to be projected substantially vertically upwardly until it engages the pivoted gate 27 which, in coöperation with the downwardly extending flange 21ᵇ' on the receiver 21 serves to direct the mold onto the receiver 21 with its open side uppermost. That is, it will be noted that the path of travel of the mold through the sand box and onto the receiver 21 is that of the character S. The mold starts with its open side uppermost, is inverted and then turned back again so that its open side is uppermost when the mold lands on the receiver 21. This path of travel for the mold through the sanding mechanism, and onto the receiver 21 is located entirely in the rear of the filling mechanism and press box and is in the plane of the receiver.

A machine of my improved construction is peculiarly adapted for making what are ordinarily known as soft mud bricks, and the construction of my mechanism is such that the mud may be worked relatively stiff, which is of great advantage in the handling and drying of the bricks, among other things, as well known to one skilled in the art.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

The invention disclosed and claimed herein is shown as applied to an apparatus embodying certain improvements disclosed and claimed in my copending application Serial No. 81,425, filed March 1, 1916. The novel subjects-matter which are common to this application and said application Serial No. 81,425 are covered by claims in the latter application; accordingly, no claim or claims are made herein to such subjects-matter.

No claim is made herein to the disclosed subject-matter relating to the mechanism for feeding the pallets, the invention therein being claimed by me in my divisional application filed April 12, 1918, Serial No. 228,080¼.

What I claim is:

1. The combination with means for filling molds with material, of rotatable devices for inverting each mold to dump the bricks therefrom, said devices including means carried thereby permitting separation of each mold and the bricks molded therein from each other, and means for feeding the molds to the filling means and then to said inverting devices.

2. The combination with means for filling molds with material, of devices for inverting each mold to dump the bricks therefrom, said devices including means carried thereby permitting separation of each mold and the bricks molded therein from each other, means for feeding the molds to said filling means and then to said inverting devices, and means for positioning a pallet to receive the bricks from each mold.

3. The combination with means for filling brick molds with material, of devices for inverting each mold to dump the bricks therefrom, said devices including means carried thereby permitting separation of each mold and the bricks molded therein from each other, means for feeding the molds to said filling means and then to said inverting devices, means for positioning a pallet to receive the bricks dumped from each mold, and means for moving each pallet and the bricks thereon, after separation of the bricks from the mold, from said inverting devices.

4. In apparatus of the class described, the combination of means constructed and arranged to receive a filled brick mold and a pallet, invert the mold, and separate the mold and the pallet with the bricks thereon from each other, mechanism for feeding the mold to said receiving, inverting and separating means, and means controlled by said feeding mechanism for delivering a pallet into position to receive the bricks from the mold when the latter is inverted.

5. The combination with means for delivering material to molds for making bricks, of means for dumping the molds, means actuated by the mold feeding means for positioning pallets on said dumping means to receive the bricks dumped from means to receive the bricks dumped from the molds, and means for feeding the molds to said material delivery means and then to said dumping means.

6. The combination of means for dumping brick molds, means for feeding the molds to said dumping means, and differential means actuated by the mold feeding means for positioning pallets one for each mold, on said dumping means to receive the bricks dumped from the molds.

7. In apparatus of the class described, the combination of a rotatable member provided with devices correlated to receive filled molds, invert them, dump the bricks therefrom and discharge the bricks and empty molds independently from said member, and means for rotating said member.

8. In apparatus of the class described, the combination of a rotatable member provided with devices correlated to receive at a predetermined position filled molds, invert them, dump the bricks therefrom and discharge the bricks at one station from said member and the empty molds at another station from said member, and means for rotating said member.

9. In apparatus of the class described, the combination of means for inverting a brick mold, means for feeding to said inverting means a pallet to receive the bricks from the mold, and means operating while the brick mold is on said inverting means for separating the mold from the bricks.

10. The combination of means for inverting a brick mold and separating the mold and a pallet with bricks thereon from each other, mechanism for feeding the mold to said inverting means, and means, controlled by the forward feeding of the mold, for moving the pallet and bricks off of said inverting means independently of the empty mold.

11. The combination of means for inverting brick molds and separating each mold and a pallet with bricks thereon from each other, said inverting means being adapted to support a pallet in position to receive the bricks from each mold, mechanism for successively feeding the molds to said inverting means, and means carried by said inverting means and actuated by the feeding of a mold thereto for moving a pallet and bricks thereon off of said inverting means.

12. The combination of rotatable means for dumping brick molds, mechanism for successively feeding the molds to said dumping means, means for moving the dumped bricks off of said dumping means, and means for supporting each empty mold on said dumping means out of contact with the dumped bricks while they are being moved therefrom.

13. The combination of rotatable means for dumping bricks from molds, mechanism for successively feeding the molds to said dumping means, means for moving the dumped bricks off of said dumping means, and means for supporting the empty molds on the rotatable dumping means out of contact with the dumped bricks while they are being moved therefrom, said supporting means permitting the discharge of each mold from said dumping means at a point beyond the point of discharge of the bricks.

14. The combination of rotatable means for dumping bricks from molds, mechanism for successively feeding the molds to said dumping means, means for moving the dumped bricks off of said dumping means, and devices operating to elevate each mold to separate it from and hold it out of engagement with the dumped bricks while they are being moved from said dumping means.

15. The combination of rotatable means for inverting and dumping brick molds, said means being arranged to receive molds and pallets and to maintain each mold and a pallet in operative relation while the mold is being inverted, means for separating each mold and a pallet with bricks thereon from each other while supported by said inverting means, and means for feeding the molds to said inverting means.

16. In apparatus of the class described, the combination of means for inverting and dumping a brick mold, said means being arranged to receive the mold and a pallet and to maintain them in operative relation while the mold is being inverted, and means, acting under the weight of the bricks on the pallet dumped thereon, for separating the mold and the pallet with dumped bricks thereon from each other.

17. The combination of devices for inverting brick molds and separating each mold and a pallet carrying bricks dumped from the mold from each other, said devices comprising a rotatable carrier and a pair of relatively movable pocket members supported thereon, and arranged to receive a filled mold and a pallet at a predetermined position, means for rotating the carrier step by step to move said pocket members to the receiving position and then to a predetermined position for discharging the pallet and bricks, connections between said pocket members to cause separation thereof due to discharge of bricks from the mold upon a pallet when the mold is inverted, and means for discharging the pallet and bricks from the carrier.

18. The combination of a rotatable carrier provided with a series of pockets adapted to receive filled brick molds and pallets, means at one side of said carrier for delivering a filled mold and a pallet to each pocket, means for rotating said carrier, whereby the molds are inverted during a half revolution of the carrier and the bricks in each mold are dumped onto the adjacent pallet, and means for moving each pallet off of said carrier at its opposite side independently of the mold.

19. The combination of a rotatable carrier provided with a series of pockets adapted to receive filled brick molds and pallets, means at one side of the carrier for delivering a filled mold and a pallet to each pocket, means for rotating said carrier, whereby the molds are inverted during a half revolution of the carrier and the bricks in each mold are dumped onto the adjacent pallet, and means actuated by the delivery of a mold to a pocket for moving each pallet off of said carrier at its opposite side.

20. The combination of a rotatable carrier adapted to receive filled brick molds and pallets, means at one side of said carrier for delivering filled molds to said carrier, means for rotating said carrier, whereby the molds are inverted during a half revolution of the carrier and the bricks in each mold are dumped onto the adjacent pallet, and a device disposed in the path of movement of each filled brick mold as it is delivered to said carrier and arranged to engage a pallet at the opposite side of said carrier, whereby the delivery of a filled mold to said carrier will simultaneously discharge a pallet therefrom.

21. The combination with means for filling molds with material for making bricks, of a rotatable carrier for receiving molds and pallets and inverting each mold to dump the bricks therefrom, devices for feeding the molds to said filling means and then to said carrier, means for moving each pallet carrying bricks from said carrier, means for returning the empty molds from said carrier to a position for actuation by said feeding means, and means for regulating the movement of the molds while returning from said carrier.

22. The combination with means for filling molds with material for making bricks, of a rotatable carrier for receiving a mold and a pallet, and inverting each mold to dump the bricks therefrom, devices for feeding the molds to said filling means and then to said carrier, means for moving each pallet carrying bricks from said carrier, a chute arranged to receive the empty molds from said carrier, and means for returning the empty molds from said chute to a position for actuation by said feeding means.

23. The combination with means for filling molds with material for making bricks, of a rotatable carrier for receiving a mold and a pallet and inverting each mold to dump the bricks therefrom, devices for successively feeding the molds to said filling means and then to said carrier, means for moving each pallet carrying bricks from said carrier, a chute arranged to receive empty molds from said carrier, means for returning the empty molds from said chute to a position for actuation by said feeding means, and means for regulating the discharge of the molds from said chute to said return means.

24. The combination with means for filling molds with material for making bricks, of a rotatable carrier for receiving a mold and a pallet and inverting each mold to dump the bricks therefrom, devices for successively feeding molds to said filling means and then to said carrier, means including an endless chain for returning the empty molds to a position for actuation by said feeding means, and means coöperating with said return means for regulating the discharge of the molds during their return movement.

25. The combination with means for filling molds with material for making bricks, of rotatable means for inverting each mold after being filled to dump the bricks onto a pallet and separating the mold from the pallet and bricks, mechanism for successively feeding the molds to said filling means and then to said inverting means, a chute adapted to receive and support a plurality of molds, means for removing the empty molds from said chute to a position for actuation by said feeding means, and a rocker at the discharge end of the chute for regulating the delivery of the molds to said return means, the front end of said rocker when operated serving to deliver a mold and its rear end serving as a stop to arrest the molds in said chute from moving forwardly.

26. The combination with means for filling molds with material for making bricks, of means for receiving a mold and a pallet and arranged to invert them to dump the bricks from the mold, mechanism for successively feeding molds to said filling means and then to said inverting means, means for returning the empty molds direct from said inverting means to a position for actuation by said feeding mechanism, said returning means including an endless chain and a rotatable guide member, and a sand box through which the molds are moved by said return means.

27. The combination with means for filling molds with material for making bricks, of means for receiving a mold and a pallet and arranged to invert the mold to dump the bricks therefrom, mechanism for successively feeding molds to said filling means and then to said inverting means, means, including an endless chain and a guide member, for returning the empty molds direct from said inverting means to a position for actuation by said feeding mechanism, and a sand box through which the molds are moved by said return means, said guide member operating to invert the molds after passing through the sand box.

28. The combination with means for filling molds with material, of rotatable means for inverting and dumping the molds, means for feeding molds to said filling means and then to said inverting means, devices for returning the empty molds from said inverting means to a position for engagement and operation by said feeding means, and means for sanding the molds during their return to said feeding means.

29. The combination with means for filling molds with material, rotatable means for dumping the molds and separating the molds and bricks from each other, means for feeding molds successively to a position to receive material from said filling means and then to said dumping means and devices including an endless chain and a revolving member for returning the molds direct from said rotatable means to a position for engagement and operation by said feeding means.

30. The combination with means for filling molds with material, means for dumping the molds, means for feeding molds successively to a position to receive material from said filling means and then to said dumping means, devices including endless chains carrying spaced arms adapted to engage with and return the empty molds to a position for engagement and operation by said feeding means, and mechanism coöperating with the movement of said chains for regulating the movement of the molds from said dumping means to said chains.

31. The combination with means for filling molds with material, of means for dumping the mold, means for feeding molds successively to a position to receive material from said filling means and then to said dumping means, devices including endless chains for returning the empty molds to a position for engagement and operation by said feeding means, mechanism for regulating the movement of the molds from said dumping means to said return devices, and means arranged to take the impact of the molds as they are delivered to said return devices.

32. The combination of a rotary carrier, having a series of pockets each adapted to receive a filled brick mold, each pocket comprising a pair of members one of which is movable relative to the other, means arranged at one side of said carrier for delivering a filled mold to each pocket, means for rotating the carrier step by step, whereby the molds are inverted and dumped, means permitting movement of the movable pocket member away from the other pocket member to free the bricks from the mold, and means for moving from the carrier the bricks dumped from each mold during the period of rest thereof.

33. The combination of a rotary carrier having a series of pockets each adapted to receive a filled mold of bricks and a pallet, each pocket comprising a pair of separable members, means for delivering a filled mold of bricks and a pallet to each pocket, means for rotating the carrier, whereby the molds are inverted and dumped, connections between each pair of pocket members permitting said members to move away from each other due to the weight of the bricks dumped on the adjacent pallet to separate the bricks from the mold, and means actuated by the delivery of a mold to a pocket for moving each pallet and the bricks thereon from the carrier.

34. The combination of a rotary carrier having a series of pockets each adapted to receive a filled brick mold and a pallet, each pocket comprising a pair of separable members, means for delivering a filled brick mold and a pallet to each pocket, means for rotating the carrier, whereby the molds are inverted and dumped, connections between each pair of pocket members permitting them to move away from each other due to the weight of the bricks dumped on the adjacent pallet to separate the bricks from the mold, means for moving the pallet and the bricks thereon from each pocket of said carrier, and means for returning each pair of pocket members to position to receive a filled brick mold.

35. The combination of a rotary carrier having a series of pockets each adapted to receive a filled brick mold and a pallet, each pocket comprising a pair of separable members, means for delivering a filled brick mold and a pallet to each pocket, means for rotating the carrier, whereby the molds are inverted and dumped, connections between each pair of pocket members permitting them to move away from each other to separate the bricks from the mold, means for moving the pallet and the bricks thereon from each pocket of said carrier, and cams for returning each pair of pocket members to position to receive a filled brick mold.

36. In apparatus of the class described, the combination of a rotary member carrying a pair of relatively movable devices adapted to receive between them a filled brick mold and a pallet, and means for rotating said member, whereby the mold is inverted and the bricks dumped onto the pallet, one of said devices being provided with an element which engages with and lifts the mold as said devices move relative to each other.

37. The combination of a rotary member carrying a pair of devices adapted to receive between them a filled brick mold and a pallet between them, and means for rotating said member, whereby the mold is inverted and the bricks dumped onto the pallet, the device adjacent the pallet being movable under the weight of the bricks on the pallet to permit separation of the bricks and mold.

38. The combination of a rotary member carrying a pair of devices adapted to receive between them a filled brick mold and a pallet, and means for rotating said member, whereby the mold is inverted and the bricks dumped onto the pallet, said devices being movable away from each other under the weight of the bricks on the pallet to cause separation of the bricks and mold.

39. The combination of a rotary member carrying a pair of devices adapted to receive between them a filled brick mold and a pallet, means for rotating said member, whereby the mold is inverted and the bricks dumped onto the pallet, said devices being movable away from each other to permit separation of the bricks and mold, and means for moving said devices together to receive a mold and a pallet.

40. The combination of a rotary member carrying a pair of spaced devices adapted to receive between them a filled brick mold and a pallet, means for rotating said member, whereby the mold is inverted and the bricks dumped onto the pallet, one of said devices being movable away from the other after the mold is inverted to cause separation of the bricks and mold, and means for returning said movable device to position to receive a mold and a pallet.

41. The combination of a rotary member carrying a pair of connected devices adapted to receive between them a filled brick mold and a pallet, means for rotating said member, whereby the mold is inverted and the bricks dumped onto the pallet, one of said devices being movable away from each other to permit separation of the bricks and mold, and a cam arranged to be engaged by the connections between said pair of devices for returning said devices to position to receive a mold and a pallet.

42. The combination of a rotatable carrier comprising a pair of spaced members arranged to support between them relatively movable pocket devices adapted to receive brick molds and pallets and to permit the discharge of the latter therefrom, and means engaging one of said members for rotating said carrier intermittently, whereby the molds delivered to said carrier are inverted and dumped.

43. The combination of a rotatable carrier adapted to receive brick molds and pallets and to permit the removal of the latter therefrom, means for rotating said carrier intermittently, whereby the molds delivered to said carrier are inverted and dumped, and means for holding said carrier stationary during delivery of a mold and a pallet thereto.

44. The combination of a rotatable carrier adapted to receive brick molds and pallets and to permit the discharge of the latter therefrom, means for rotating said carrier intermittently, whereby the molds delivered to said carrier are inverted and dumped, means for holding said carrier against forward movement during the delivery of a mold and a pallet thereto, and means controlled by said intermittently operating means for disconnecting said holding means to permit rotation of said carrier.

45. The combination of a rotatable carrier comprising a pair of spaced casings, and a pair of members arranged to receive between them a mold and a pallet, devices arranged within said casings for movably supporting one of said members to permit separation of the mold and pallet at a predetermined position, and means for rotating said carrier.

46. The combination of a rotatable carrier comprising a pair of spaced casings, a pair of members arranged to receive between them a mold and a pallet, devices carried by said casings for movably supporting said members to permit separation of the mold and pallet at a predetermined position, connections between said devices for causing movement of said devices simultaneously, and means for intermittently rotating said carrier.

47. The combination of a rotatable carrier comprising a pair of spaced casings, a pair of members arranged to receive between them a filled brick mold and a pallet, and devices carried by said casings for movably supporting said members to permit them to move toward and from each other, connections between said members for causing them to move simultaneously, means for actuating said connections, and means for rotating said carrier.

48. The combination of a rotatable carrier comprising end members fixed to a shaft, and a pocket supported by said end members and arranged to receive a mold and a pallet, one of said end members being provided with a series of shoulders, a dog arranged to engage the shoulders to prevent forward movement of said carrier, and means for rotating said carrier intermittently and controlling the operation of said dog.

49. The combination of a rotatable carrier comprising end members fixed to a shaft, and a pocket supported by said end members and arranged to receive a mold and a pallet, one of said end members being provided with a series of shoulders and sets of gear teeth, a dog arranged to engage said shoulders to prevent forward movement of said carrier, a pinion having teeth coöperating with the teeth on said end member for rotating the carrier intermittently, and means for controlling the disengagement of said dog from said shoulders in correlation to the operation of said pinion.

50. The combination of a support, means for filling molds with material, mechanism for dumping the molds, a pallet supply mechanism, reciprocating means, including a rack, for feeding the molds to the filling means and then to said dumping mechanism, a gear meshing with said rack, and connections between the gear and said pallet supply mechanism for operating the latter.

51. The combination of a support, means for filling molds with material, mechanism for dumping the molds, a mechanism for supplying pallets to said dumping mechanism, reciprocating means for feeding molds to said filling means and then to said dumping mechanism, racks carried respectively by said support and one element of said reciprocating means, a gear between and meshing with said racks, and connections between said gear and said pallet supply mechanism for operating the latter, 52. The combination, of a rotatable carrier for receiving a mold and a pallet and inverting the mold to dump the bricks therefrom, devices for feeding the mold to said carrier, means for moving the pallet carrying the bricks from said carrier, and a chute arranged to receive the empty mold from said carrier.

53. The combination with means for filling molds with material for making bricks, of a rotatable carrier for receiving a mold and a pallet and inverting each mold to dump the bricks therefrom, devices for successively feeding molds to said filling means and then to said carrier, means for moving each pallet carrying bricks from said carrier, and means for returning the empty molds direct from said carrier to a position for actuation by said feeding means.

In testimony whereof I affix my signature, in the presence of a witness.

HENRY W. B. GRAHAM.

Witness:
Geo. B. Pitts.

It is hereby certified that in Letters Patent No. 1,301,685, granted April 22 1919, upon the application of Henry W. B. Graham, of New London, Ohio, for an improvement in "Apparatus for Making Bricks," errors appear in the printed specification requiring correction as follows: Page 6, line 92, for the word "moved" read *moving;* page 7, line 56, for the word "device" read *devices;* page 9, line 71, for the word "end" read *ends;* page 17, line 116, claim 19, for the article "the" read *said;* page 19, line 41, claim 32, for the article "the" read *a;* same page, line 105, claim 37, cancel the words "between them"; and that the said Letters Patent should be read with these corrections therein that the same may conform to the record of the case in the Patent Office.

Signed and sealed this 17th day of June, A. D., 1919.

[SEAL.]

J. T. NEWTON,
*Commissioner of Patents.*

Cl. 25—2.

It is hereby certified that in Letters Patent No. 1,301,685, granted April 22 1919, upon the application of Henry W. B. Graham, of New London, Ohio, for an improvement in "Apparatus for Making Bricks," errors appear in the printed specification requiring correction as follows: Page 6, line 92, for the word "moved" read *moving;* page 7, line 56, for the word "device" read *devices;* page 9, line 71, for the word "end" read *ends;* page 17, line 116, claim 19, for the article "the" read *said;* page 19, line 41, claim 32, for the article "the" read *a;* same page, line 105, claim 37, cancel the words "between them"; and that the said Letters Patent should be read with these corrections therein that the same may conform to the record of the case in the Patent Office.

Signed and sealed this 17th day of June, A. D., 1919.

[SEAL.]

J. T. NEWTON,
*Commissioner of Patents.*

Cl. 25—2.